US006793497B2

(12) United States Patent
Herman et al.

(10) Patent No.: US 6,793,497 B2
(45) Date of Patent: Sep. 21, 2004

(54) MOLECULAR MODELS

(75) Inventors: Timothy M. Herman, Wauwatosa, WI (US); Michael H. Patrick, Pine River, WI (US); Vito R. Gervasi, New Berlin, WI (US); Gunnar Vikberg, Rio de Janeiro (BR)

(73) Assignee: Milwaukee School of Engineering, Milwaukee, WI (US)

( * ) Notice: Subject to any disclaimer, the term of this patent is extended or adjusted under 35 U.S.C. 154(b) by 0 days.

(21) Appl. No.: 09/932,304

(22) Filed: Aug. 17, 2001

(65) Prior Publication Data

US 2002/0076682 A1 Jun. 20, 2002

Related U.S. Application Data

(63) Continuation-in-part of application No. 09/439,324, filed on Nov. 12, 1999, now Pat. No. 6,471,520.

(51) Int. Cl.[7] ............................................. G09B 23/26
(52) U.S. Cl. ........................................ 434/278; 434/277
(58) Field of Search ................................. 434/276, 277, 434/278, 279; 164/71.1

(56) References Cited

U.S. PATENT DOCUMENTS

| | | | |
|---|---|---|---|
| 3,577,660 A | | 5/1971 | Kenney ........................ 35/18 |
| 3,604,130 A | | 9/1971 | Forsstrom .................. 35/18 A |
| 3,706,139 A | | 12/1972 | Brumlik ..................... 35/18 A |
| 3,854,223 A | * | 12/1974 | Dingman, II ............... 434/278 |
| 3,939,581 A | * | 2/1976 | Clarke, Jr. ................. 434/278 |
| 4,184,271 A | * | 1/1980 | Barnett, Jr. ................ 434/279 |
| 4,245,920 A | | 1/1981 | Barrett ....................... 403/305 |
| 4,325,698 A | | 4/1982 | Darling et al. ............. 434/278 |
| 4,348,190 A | | 9/1982 | Barrett ....................... 434/278 |
| 4,378,218 A | | 3/1983 | Fletterick et al. .......... 434/279 |
| 4,398,888 A | | 8/1983 | Darling et al. ............. 434/278 |

(List continued on next page.)

FOREIGN PATENT DOCUMENTS

| | | |
|---|---|---|
| EP | 0 085 262 A1 | 8/1983 |
| EP | 0 535 720 A2 | 4/1993 |
| EP | 0 691 194 A1 | 1/1996 |
| EP | 0691194 * 1/1996 | .......... B29C/67/00 |
| FR | 2 678 206 | 12/1992 |

OTHER PUBLICATIONS

Rubin, B. and Richardson, J.S., "The simple construction of protein alpha–carbon models", Biopolymers 11, 2381–2385 (1972).*

M. Bailey et al.: "The use of solid physical models for the study of macromolecular assembly," Current Opinion in Structural Biology, Apr. 1998, 8:202–208.

G. Dodson: "Protein crystallography and its new revolution," Elsevier Science Publishers B.V., Amsterdam, TIBBS 11—Aug. 1986.

S. Hall: "Protein Images Update Natural History," Science, vol. 267, Feb. 3, 1995, pp. 620–624.

B. Rubin et al.: "The Simple Construction of Protein Apha–a–Carbon Models," Communication to the Editor, Biopolymers, vol. 11 (1972), pp. 2381–2385.

*Primary Examiner*—Kurt Fernstrom
(74) *Attorney, Agent, or Firm*—Michael Best & Friedrich LLP

(57) ABSTRACT

Three-dimensional models of molecules, including proteins, and molecular model construction kits, including an alpha helix construction kit, a beta sheet construction kit, and a nucleic acid construction kit. The three-dimensional models of molecules include one or more elongated tubular strands representing alpha carbons and the bonds between the alpha carbons. The alpha helix and beta sheet construction kits include amino acid backbone units, hydrogen bond units, and side chain units. The nucleic acid construction kits include base units, hydrogen bond units, sugar units, and phosphate units.

69 Claims, 26 Drawing Sheets

U.S. PATENT DOCUMENTS

| | | | |
|---|---|---|---|
| 4,416,635 A | 11/1983 | Smith | 434/280 |
| D278,834 S | 5/1985 | Satoh | D19/62 |
| 4,622,014 A | 11/1986 | Mikelsaar | 434/278 |
| 4,702,702 A | 10/1987 | Mikelsaar | 434/278 |
| 4,812,128 A | 3/1989 | Mikelsaar | 434/278 |
| 4,877,406 A | 10/1989 | Wilk | 434/278 |
| 4,906,122 A | 3/1990 | Barrett et al. | 403/305 |
| 5,030,103 A | 7/1991 | Buist et al. | 434/278 |
| 5,189,781 A | 3/1993 | Weiss et al. | 29/527.2 |
| 5,265,030 A | 11/1993 | Skolnick et al. | 364/495 |
| 5,296,688 A | 3/1994 | Hamilton et al. | 235/375 |
| 5,555,366 A | 9/1996 | Teig et al. | 395/161 |
| 5,583,973 A | 12/1996 | DeLisi et al. | 395/120 |
| 5,622,216 A | 4/1997 | Brown | 164/71.1 |
| 5,779,833 A | 7/1998 | Cawley et al. | 156/89.11 |
| 5,824,250 A | 10/1998 | Whalen et al. | 264/219 |
| 5,869,170 A | 2/1999 | Cima et al. | 428/304.4 |
| 5,893,404 A | 4/1999 | Mendez et al. | 164/71.1 |
| 6,117,612 A | 9/2000 | Halloran et al. | 430/269 |
| 6,129,872 A | 10/2000 | Jang | 364/75 |
| 6,139,574 A | 10/2000 | Vacanti et al. | 623/1.44 |

\* cited by examiner

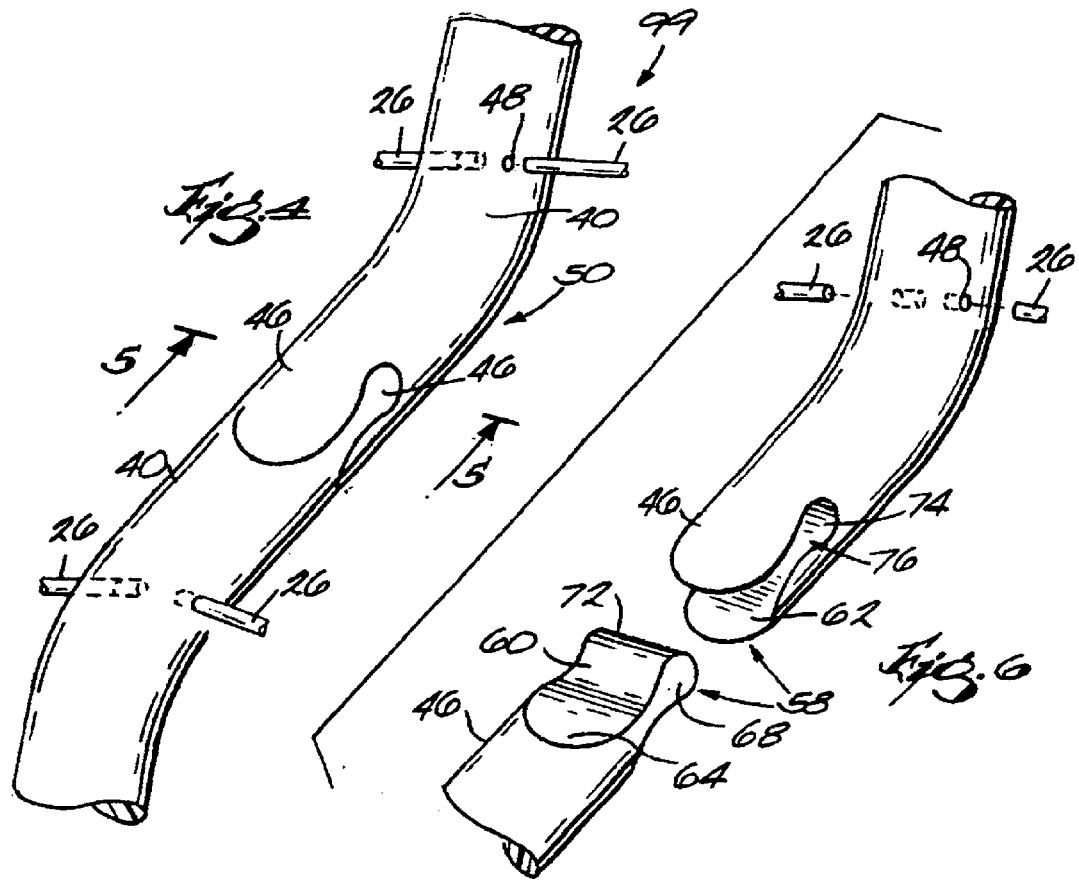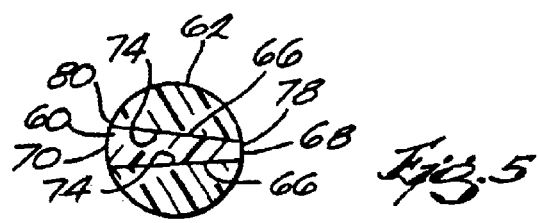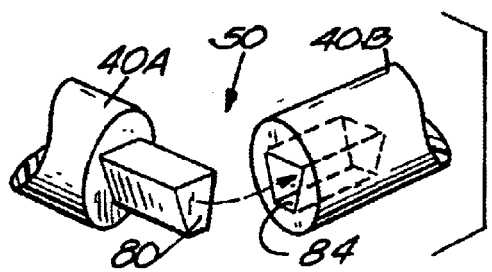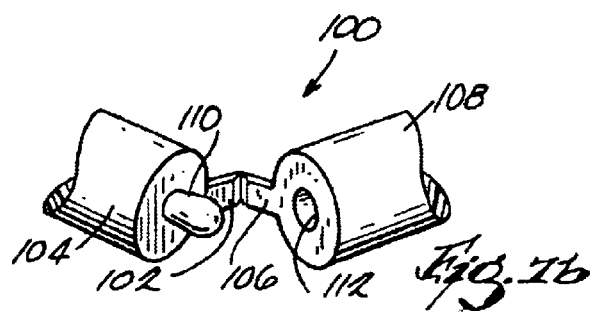

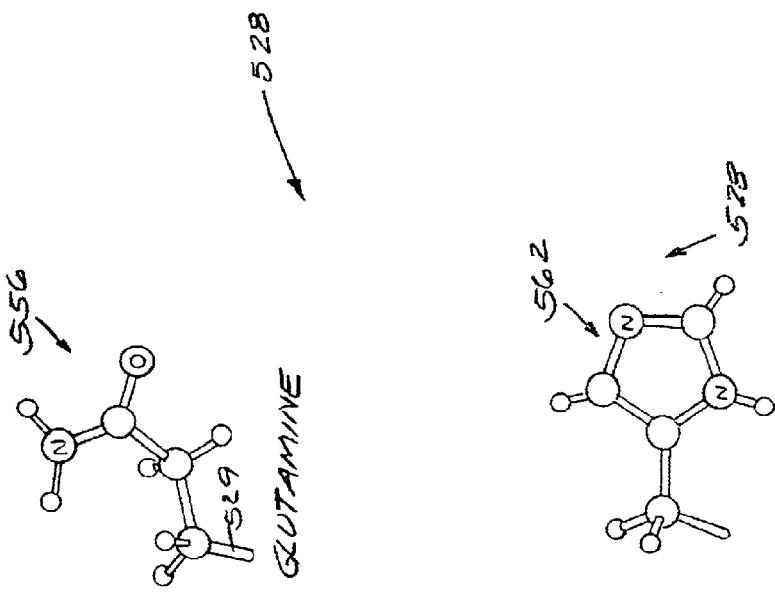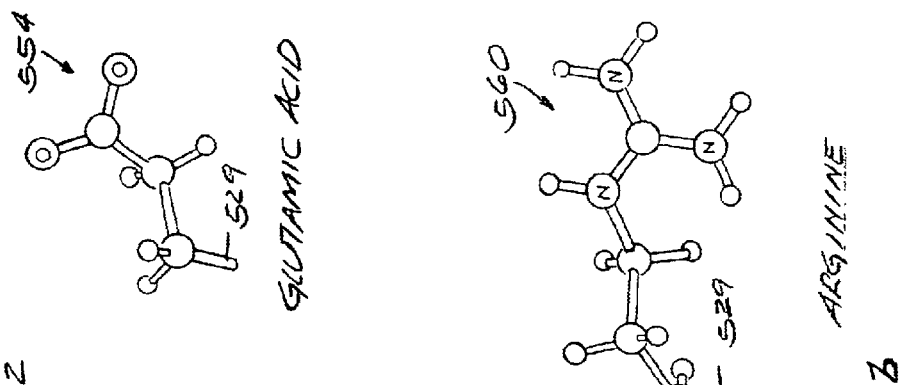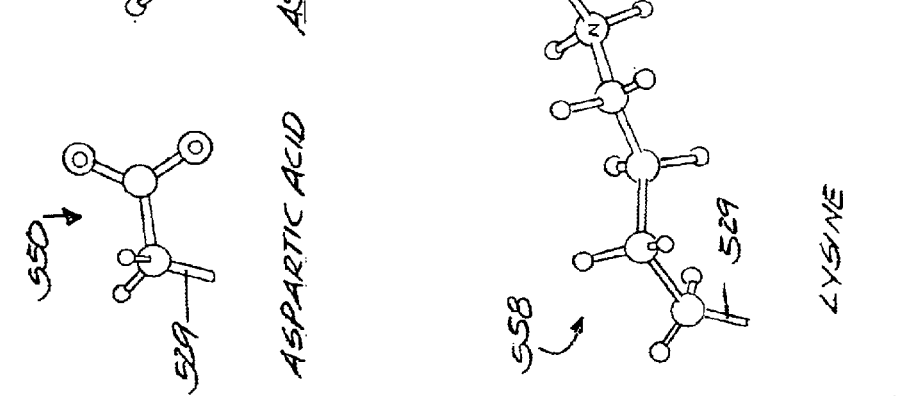
Fig. 13B

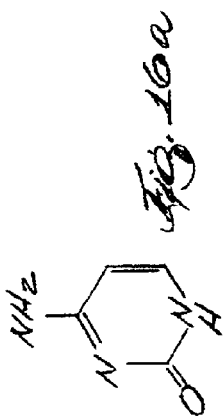
Fig. 16a
CYTOSINE
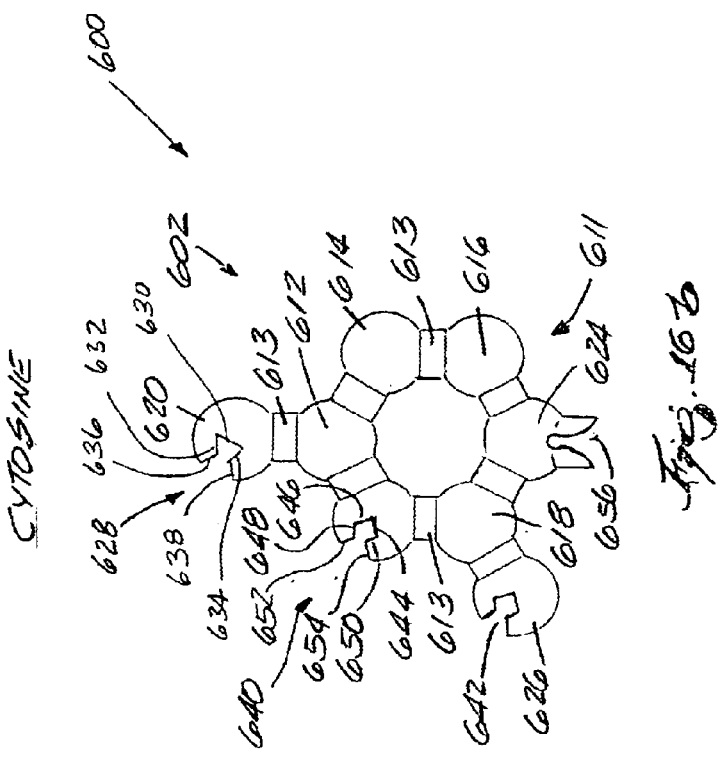
Fig. 16b
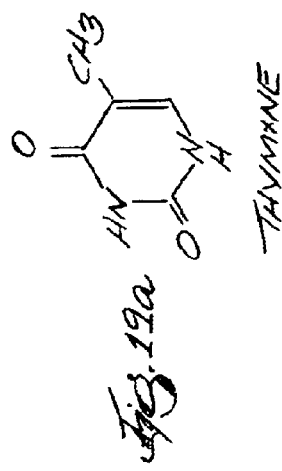
Fig. 19a
THYMINE
Fig. 19b

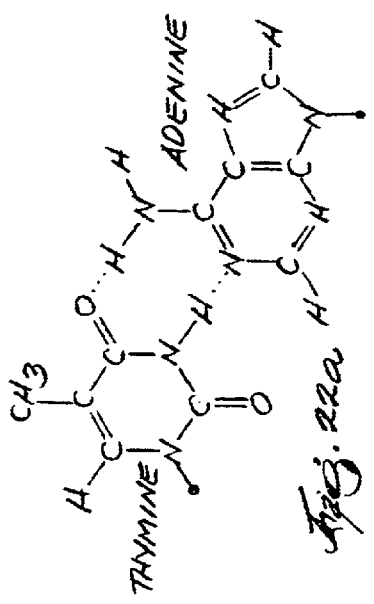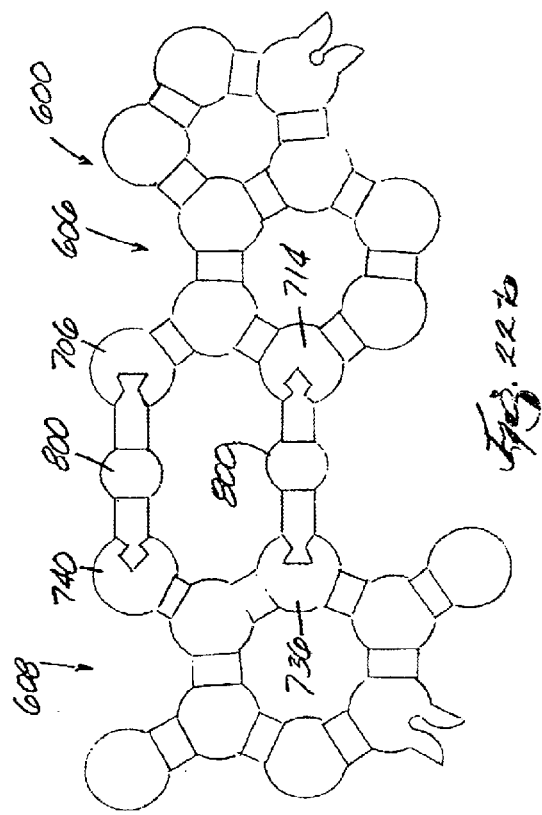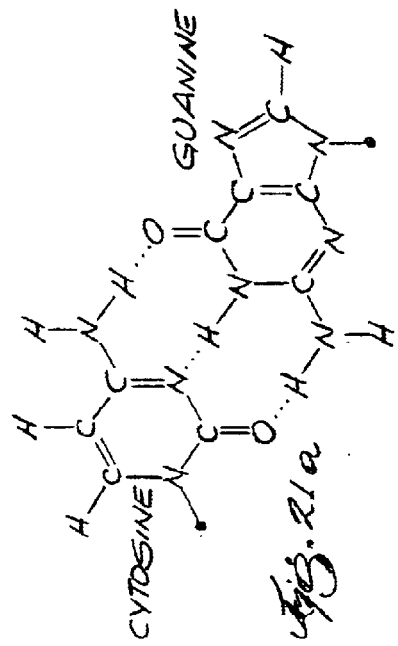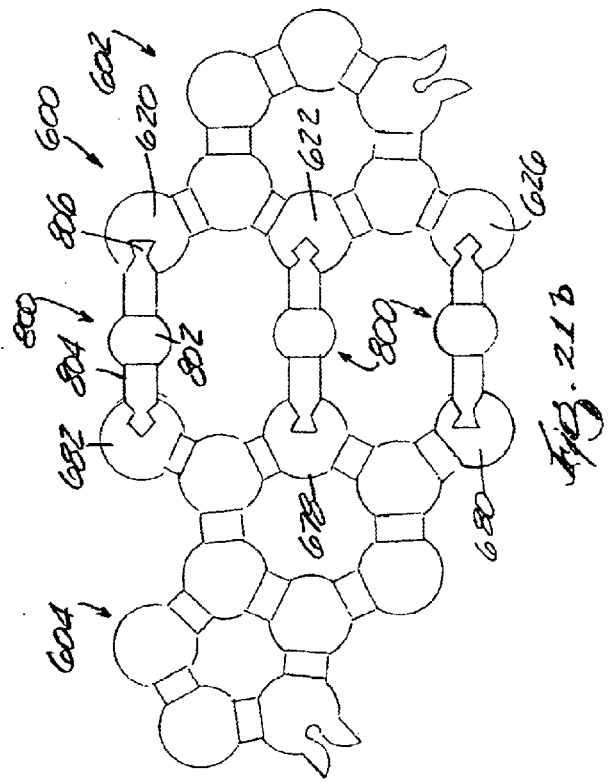

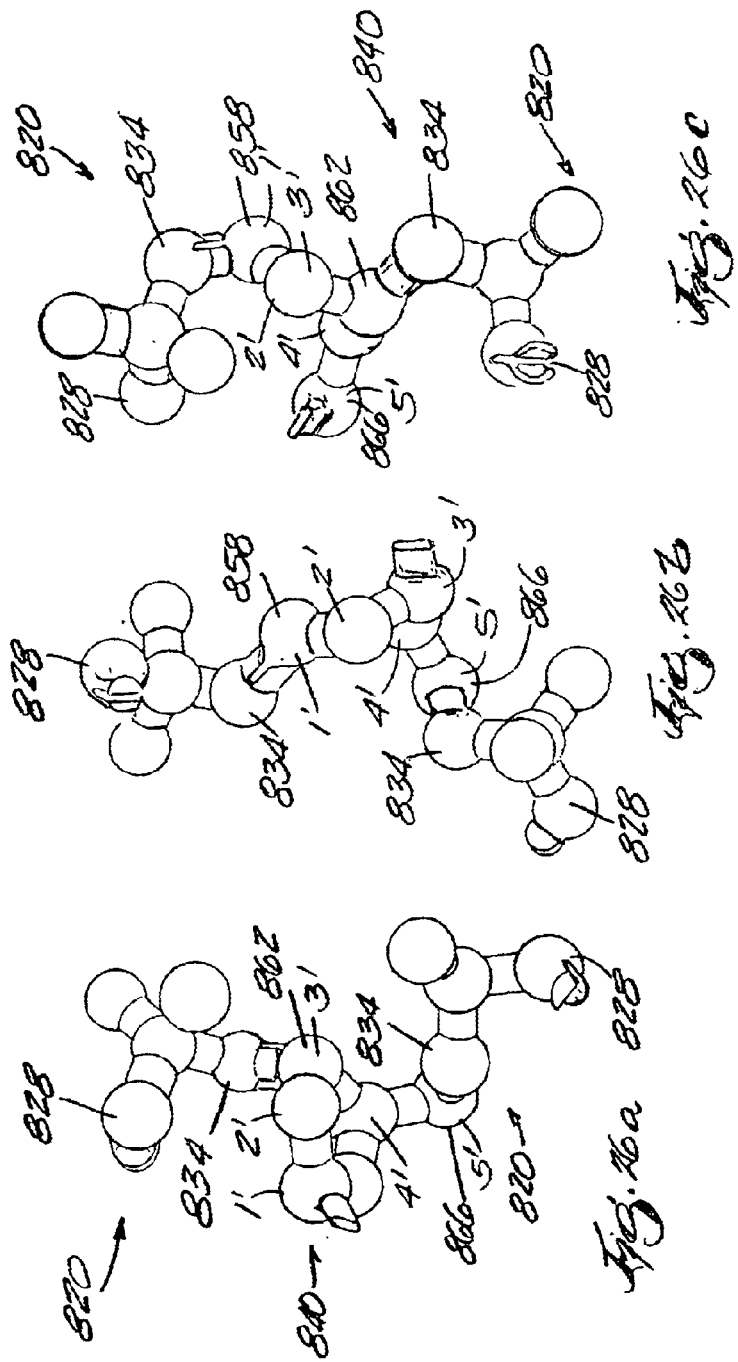

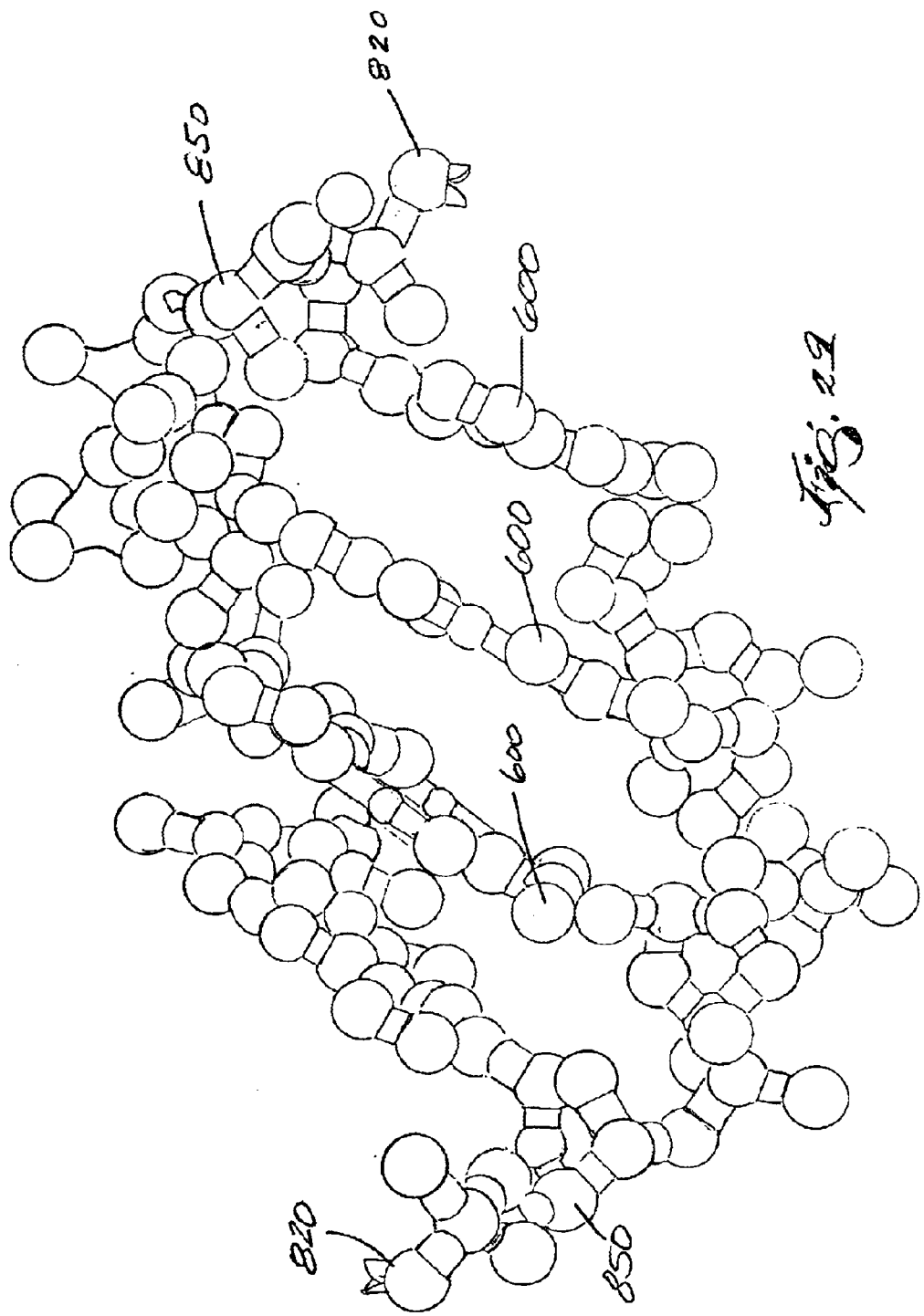

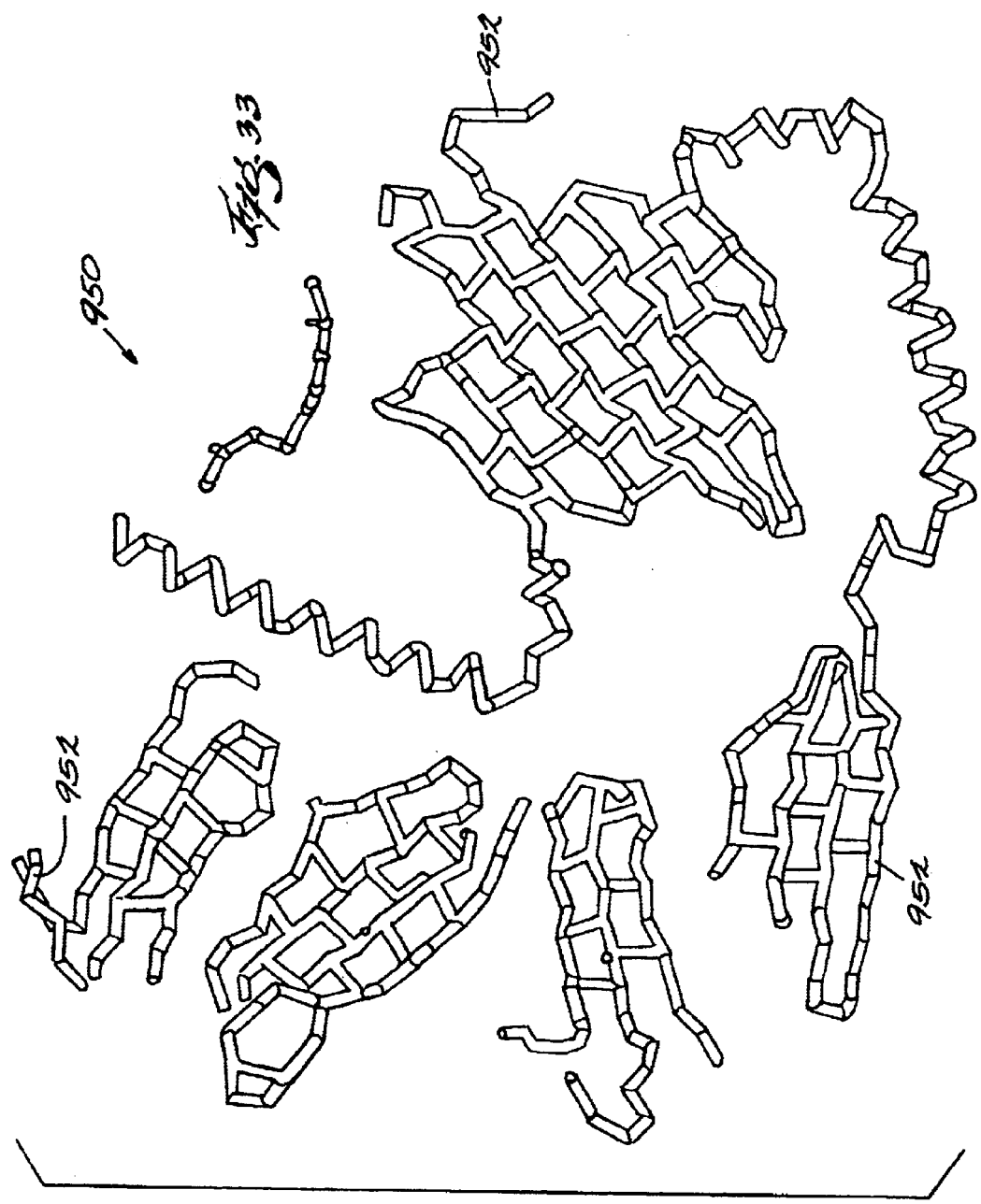

MOLECULAR MODELS

RELATED APPLICATIONS

This is a Continuation-in-part under 35 U.S.C. §120 to U.S. patent application Ser. No. 09/439,324 filed Nov. 12, 1999, U.S. Pat. No. 6,471,520.

FIELD OF THE INVENTION

The invention relates generally to three-dimensional models of molecules, and more particularly to molecular model construction kits.

BACKGROUND OF THE INVENTION

The study of molecular structure and function is at the core of modern biology, and shapes much of biological research. Images of newly solved structures are appearing at an ever increasing rate in science journals as structural biology becomes a mainstream science. At the same time that understanding of molecular structures has increased, methods to model and communicate understanding of these structures has not.

A number of different types of molecular model construction are known and used to represent molecular structures and to study the interaction between a large molecule, such as an enzyme, and its substrate. Many of the models currently in use are well known. For example, it is known to use ball-and-stick models in which balls representing atoms are connected by rigid or flexible connectors representing chemical bonds. Using such models it is possible by tedious manual construction to assemble ball-and-stick representations of complex molecules.

Other known molecular models currently in use include space-filled individual components fabricated of plastic or other rigid material representing the space-filling nature of individual molecular structures. These models must also be individually assembled from construction units representing single atoms, involving tedious manual manipulation by highly skilled personnel. One reason why skilled personnel are sometimes needed to assemble molecular structure representations from known modeling kits is that the modeling kits include many parts that can be assembled in a variety of arrangements. Due to the flexibility of the kit, a model can be assembled incorrectly, thus inaccurately representing the structure of the subject molecule. A skilled person having knowledge of the subject structure's configuration is therefore needed to accurately assemble the model.

Information technology also provides one type of readily-available, computer-generated, virtual model of complex structures through the generation of interactive computer images. Although the image created on the computer screen is two-dimensional, various shading, depth-cueing and kinetic-depth effects can produce an image that takes on three-dimensional character when the model appears to rotate on the screen. Although these computer visualization programs were originally developed for UNIX-based computer workstations, versions now exist for use in desktop computer (PC or Mac) environments. Once such program, RasMol, is publicly available software. An extensive molecular structure database exists at the Protein Data Bank web site (http//www.rcsb.org/pdb) which can be downloaded and used with RasMol, or in the RasMol-based Chime software, to model molecular structures in a computer environment.

SUMMARY OF THE INVENTION

Although computer-generated images can be used by experienced users to view molecular structure in great detail, these virtual models are often unavailable in classrooms and other facilities without computers. Moreover, even when such virtual modeling apparatus is available, the virtual models can be unappreciated by those who have no previous experience with either the modeling software or the molecular structure. For these individuals, physical models provide a tangible object to which users can relate in a tactile manner. In general, a three-dimensional model of complex structures assists in gaining a more complete understanding of the functional consequences of the three-dimensional structure.

Also, physical models are a necessary complement to, not a substitute for, computer-aided visualization. While interactive computer-generated images are much superior to static, two-dimensional pictures, this technology does not naturally facilitate group discussion. Only one person controls the computer "model," and it is often difficult for inexperienced students to visualize the three-dimensional character of these computer-generated images. However, a physical model can be thought of as the ideal portable, three-dimensional, graphical display. Unlike a computer-generated image, it is always "on," and can be shared among multiple users quickly and easily. Thus, there is a need for accurate, affordable physical models of biological structures.

In one embodiment, the invention provides an affordable, easy-to-use, accurate three-dimensional model of a complex structure, such as a molecule or chain of molecules, that can be used to study the structure and its function, as well as a method to manufacture the three-dimensional model. More particularly, in one embodiment, the invention provides a three-dimensional model of a complex structure including a backbone representation of a series of predetermined elements interconnected by representations of bonds extending between the predetermined elements.

In another aspect, the invention provides a method of making a three-dimensional model through the application of rapid prototyping technology, particularly Solid Freeform Fabrication (SFF) techniques. The use of such techniques is particularly well-suited to the production of physical models of the complex geometry found in molecular structures. The complex geometry found in three-dimensional protein structures precludes the use of subtractive manufacturing methods as found in traditional numerical control machining. However, these complex structures can be produced by the additive manufacturing processes employed by SFF prototyping technologies.

Although physical models produced by rapid prototyping technologies have all the properties required to be useful as instructional aids in science education, the use of rapid prototyping technologies alone is not feasible because such techniques are too slow and costly to produce molecular models in large numbers.

Accordingly, in another embodiment, the invention provides a method of manufacturing a model of a complex structure, such as a molecular model, including steps that afford use of relatively inexpensive processes such as injection molding. In particular, the invention also provides a method of making a three-dimensional model including the use of rapid prototyping techniques to divide the model into a series of segments that can be more easily manufactured than the model as a whole and that can be assembled by persons without any particular knowledge of the molecular structure and without any particular or special modeling skills.

Another aspect of the invention is the provision of a model including a plurality of model elements or segments that each have interconnecting fittings which are configured to engage only the appropriate adjacent segments, i.e., the segments fit together in only one way, so that the model as a whole can be constructed without foreknowledge of the modeled structure and without any special training. The configurations of the segments and the interconnecting fittings are also amenable to injection molding.

Another aspect of the invention is a macro-molecule construction kit including amino acid backbone units, hydrogen bond units coupleable to each one of the amino acid backbone units, and side chain units coupleable to each one of the amino acid backbone units.

Another aspect of the invention is a nucleic acid construction kit including a base units, hydrogen bond units coupleable between each one of the base units, sugar units coupleable to each one of the base units, and phosphate units coupleable to each one of the sugar units.

The invention thus provides several advantages. First, the invention provides a model of a complex structure, such as a molecular structure, divided into a series of short segments each of which possess a simple geometry. The model segments afford production by injection molding and have uniquely configured connectors built into the ends of the segments, allowing contiguous segments to be joined together to create the model. The invention also provides a method of making the model in an accurate, cost effective manner, and a method for representing covalent bonds which act in the molecular structure by the use of structural elements initially formed through the use of rapid prototyping techniques.

Other features and advantages of the invention will become apparent to those skilled in the art upon review of the following detailed description, claims and drawings.

BRIEF DESCRIPTION OF THE DRAWINGS

FIG. 4 is perspective view of a portion of a model that is an alternative embodiment of the model shown in FIG. 1.

FIG. 5 is a view taken along line 5—5 in FIG. 4.

FIG. 6 is a perspective view of the segments shown in FIG. 4 in a separated arrangement.

FIGS. 7($a$) and 7($b$) are perspective views of two model segments which are alternative embodiments of the segments shown in FIG. 4.

FIG. 11($b$) is a first side view of an amino acid backbone unit; and FIG. 11($c$) is a second side view of an amino acid backbone unit.

FIG. 12($b$) is a perspective view of two amino backbone units coupled together.

FIG. 15($b$) illustrates the nitrogen and carbon atoms of an alpha helix; and FIG. 15($c$) illustrates the nitrogen, carbon, and oxygen atoms and the side chains of an alpha helix.

FIG. 16($a$) illustrates the chemical structure of cytosine; and FIG. 16($b$) is a top view of a cytosine unit.

FIG. 17($b$) is a top view of a guanine unit.

FIG. 18($b$) is a top view of an adenine unit.

FIG. 19($a$) illustrates the chemical structure of thymine; and FIG. 19($b$) is a top view of a thymine unit.

FIG. 20($b$) is a top view of an uracil unit.

FIG. 21($a$) illustrates the chemical structure of cytosine bonded to guanine; and FIG. 21($b$) is a top view of a cytosine unit coupled to a guanine unit via three hydrogen bond units.

FIG. 22($a$) illustrates the chemical structure of thymine bonded to adenine; and FIG. 21($b$) is a top view of a thymine unit coupled to an adenine unit via two hydrogen bond units.

FIG. 23($b$) is a perspective view of a phosphate unit.

FIG. 24($b$) is a perspective view of a deoxyribose unit.

FIG. 25($b$) is a perspective view of a ribose unit.

FIG. 26($b$) is a perspective view of two phosphate units coupled to a deoxyribose unit in a 5' to 1' configuration; and FIG. 26($c$) is a perspective view of two phosphate units coupled to a deoxyribose unit in a 3' to 1' configuration.

FIG. 27($b$) is a perspective view of a model of a portion of a single DNA helix.

FIG. 28 illustrates the 5' to 3' configuration of a DNA double helix.

FIG. 29 is a perspective view of a model of a portion of a DNA double helix.

FIG. 31($b$) is a perspective view of a lantern structure of a GFP model.

FIG. 33 illustrates the MHC model of FIG. 32 segmented into several fragments.

Figure 1:
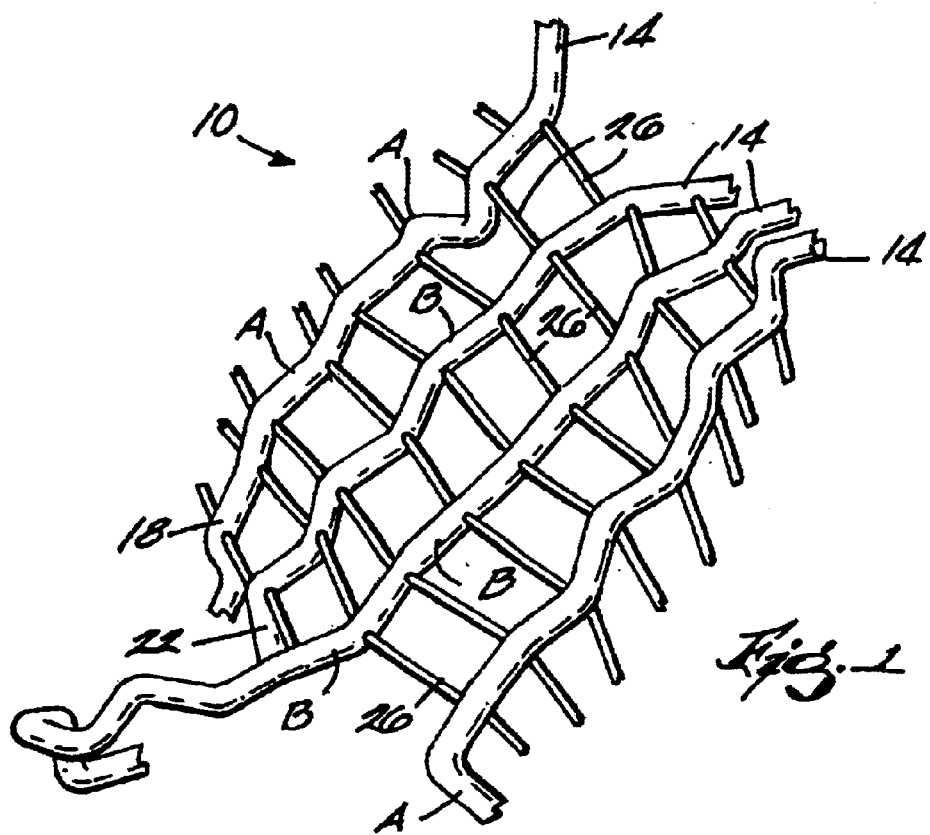
FIG. 1 is a perspective view of a model of a complex structure embodying the present invention.
Figure 2:
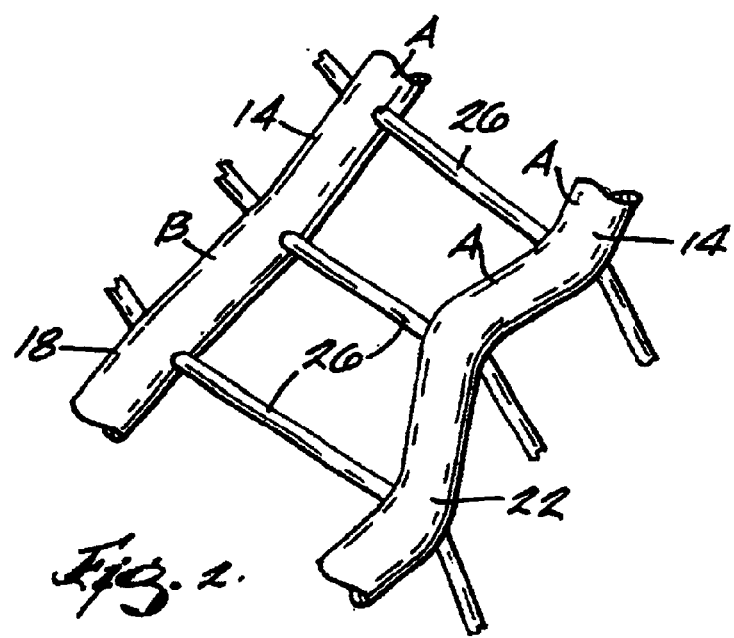
FIG. 2 is an enlarged view of a portion of the model shown in FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

The drawings illustrate a preferred embodiment of a model and method of making the model which embody the invention. First, the structure of the model is discussed, and then a preferred method for making the model is discussed.

Referring first to FIG. 1, FIG. 1 illustrates a model 10 of a complex structure, such as a portion of a molecular structure. While the model 10 is useful for representing the configuration of a variety of complex structures, including both microscopic structures and structures of a large scale, for the purposes of simplicity and description, the illustrated model 10 represents a portion of a protein. Proteins are polymers composed a variety of amino acids, each of which has a central or "alpha" carbon atom. The amino acids are monomers interconnected by covalent bonds. The model 10 includes structure representing the relative locations of a chain of alpha carbons in the respective amino acids, and structure representing the forces of the covalent bonds acting on the amino acids. Again, other structures or attributes of the subject structure represented by the model can be successfully used as critical locations or data points for the purpose of modeling. However, the present description uses alpha carbons of a protein as the critical structure or data points to illustrate one type of model of a complex structure. Those of ordinary skill in the art will readily understand that other complex structures, their attributes, and desired use of the model can be considered in successfully modeling or presenting the subject structure.

To represent the protein's structure, the model 10 includes a plurality of elongated, tubular strands 14. The strands 14 have portions that are curved, bent, twisted or straight, depending on the subject represented by the model. In the illustrated model 10, the bends (indicated by reference letter "A") in the strands 14 tend to indicate the location of an alpha carbon. The strands 14 also have relatively straight sections extending between the bends A. The straighter portions (indicated by the reference letter "B") of the strands 14 represent covalent bonds acting along a vector extending between the alpha carbons. The tubular strands 14 are interconnected to form an alpha carbon backbone model.

The backbone model 10 thus represents the relative position in three-dimensional space of selected elements, namely alpha carbons, and represents the covalent bonds acting on the alpha carbons. As explained below, each of the strands 14 follows a path corresponding to the locations of a series of alpha carbons interconnected by covalent bonds. In the model shown in FIG. 1, a first strand 18 extends along a first path corresponding to a first set of data points or elements, i.e., alpha carbons. The model 10 also includes a second strand 22 extending along a second path delineated by a second set of data points or elements. This representation of the protein molecule's structure delineates the backbone of the modeled protein, i.e., shows the basic shape and structure of the protein, and is therefore a useful three-dimensional representation of the protein's configuration.

The model 10 also includes a plurality of relatively thin connecting legs 26 which extend between and connect adjacent strands 14 and which represent respective hydrogen bonds in the subject protein. More particularly, hydrogen bonds in a protein's molecular structure can be a significant force determining the form and stability of the protein. Often such hydrogen bonds are created by a shared hydrogen atom located between closely spaced amino acids. For the purpose of modeling, the thin legs 26 are used to represent the effect of a hydrogen bond acting on the amino acids, and extend between the portions of adjacent strands at locations representing the alpha carbons of adjacent strands 14. The connecting legs 26 each extend along a path corresponding to the vector along which the force of hydrogen bond acts on a pair of selected structural elements, e.g., a pair of alpha carbons.

Other molecular structures can be represented by the model 10 but are not shown. For example, side chains extending from the central carbons can be represented on an atom-by-atom basis if desired, by identifying, locating and interconnecting the atoms in the side chain with the appropriate position of the backbone model. Similarly, in the case of proteins, it is often desirable to identify particular substrates or inhibitors which can interact with the modeled protein. Such complex structures can either be included as an integral part of the modeled protein or created as a separately-modeled complex structure. Specific molecular structures that can be represented by the model 10 may include, but are not limited to, adenosine tri-phosphate (ATP)-ase, beta-globin, calmodulin, chymotrypsin, green fluorescent protein (GFP), human immunodeficiency virus (HIV) protease, lysozyme, myosin, p53, zif268, zinc finger, major histocompatibility complex (MHC), immunoglobulin, lac repressor, and beta-galactosidase.

In one embodiment, the model 10 is color-coded according to an atomic color scheme. A suitable atomic color scheme is the Corey, Pauling, Kultin (CPK) color scheme in which gray represents carbon, white represents hydrogen, red represents oxygen, blue represents nitrogen, orange represents iron or phosphorus, and yellow represents sulfur.

The method for producing the model 10 preferably includes the use of one of several known rapid prototyping technologies or solid freeform fabrication (SFF) technologies. These techniques can be effectively used to produce accurate alpha-carbon backbone models of protein structures, including representations of the effect of hydrogen bonds. These techniques can be used to fabricate the backbone models using a numerical description of the molecule to be modeled expressed in a three-dimensional space. Such a publicly available description in an x, y, z, format can be obtained for many proteins and other molecular structures from the Protein Data Bank (http//www.rcsb.org/pdb).

Stereolithography is one of several known SFF techniques. In practicing this process using equipment commonly known as stereolithography apparatus (SLA), an ultraviolet laser beam selectively scans a reservoir of a of photosensitive liquid along a predetermined path. Upon the laser beam being exposed to the portions of the liquid lying in the beam's path, the exposed portions of the liquid cure or solidify through polymerization. An example of stereolithographic methods and equipment are disclosed in U.S. Pat. No. 5,256,340, which issued to Allison on Oct. 26, 1993, and which is incorporated herein by reference.

In addition to these specifically described SFF techniques, there are other techniques not described in detail here. Among these techniques are fused deposition modeling (FDM), selective laser sintering (SLS), and laminated object manufacturing (LOM), all of which are additive processes whereby a solid object is created on a layer-by-layer basis.

In general, SFF technologies depend on the use of computers to generate cross-sectional patterns representing the layers of the object being formed, and generally require the associated use of a computer and computer-aided design and manufacture (CAD/CAM) software. In general, these techniques rely on the provision of a digital representation of the object to be formed. The SLA or other apparatus for carrying out the fabrication of the object then utilizes the digital representation of the object for building the layers of the object by, for example, determining the path of the laser beam to selectively expose UV light to photosensitive liquids.

In the normal practice of SFF techniques, because objects or parts being fabricating are built on a layer-by-layer basis, where each layer represents a thin cross-section of the part to be formed, is it possible to build solid objects. However, in the alternative, it is also possible to form hollow structures wherein just the periphery of the object is formed. Such a hollow structure can be formed by formation of a substantially intact boundary or skin only. The desired internal and external object geometry depends upon the anticipated usage of the object formed by the SLA and is based upon a computer generated model or representation of the object. For example, it may be desirable to produce an object with a hollow portions, solid portions and combinations thereof.

Figure 8:
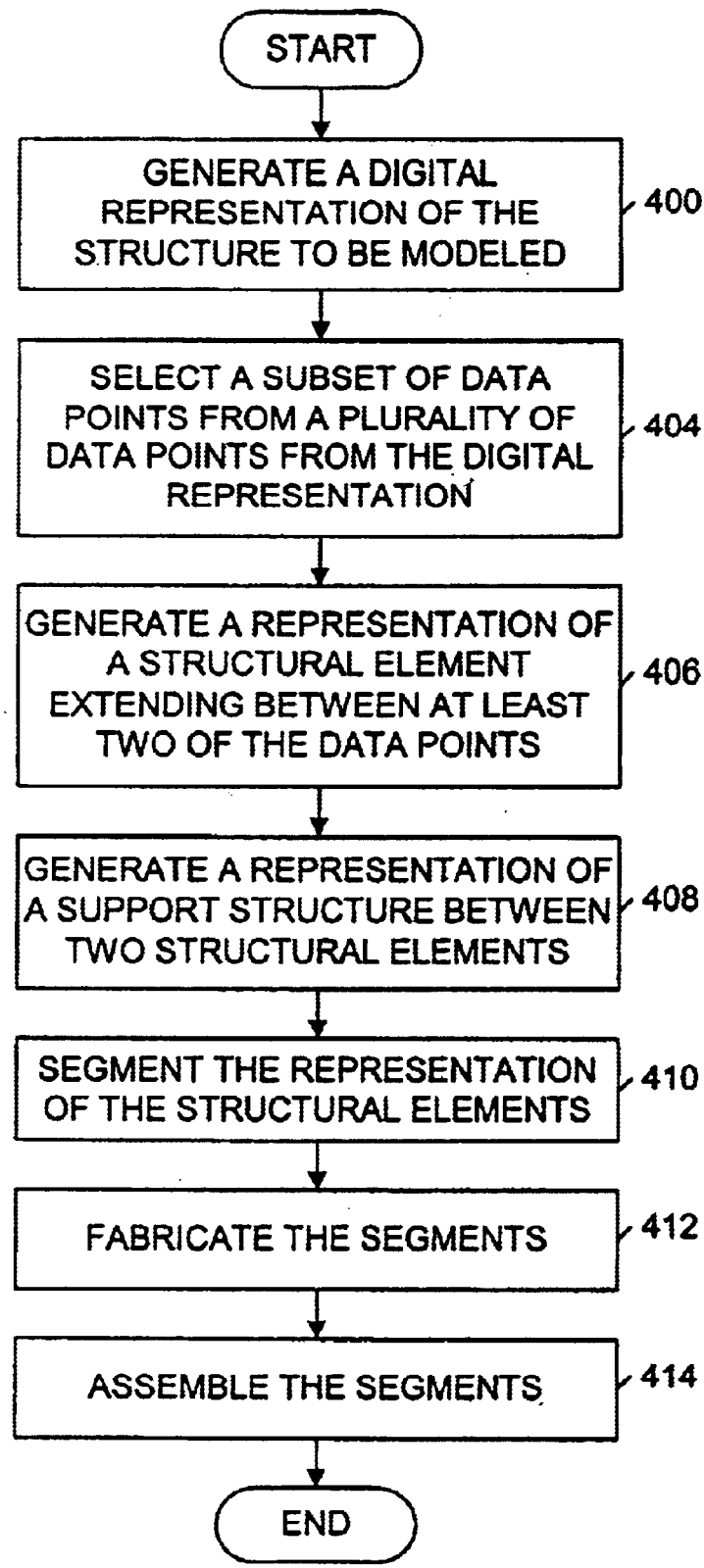
FIG. 8 is a flow chart illustrating the method of making a model of the type shown in FIG. 1.

A method using SFF techniques to produce the model 10 includes (FIG. 8) generating 400 a digital representation of the structure to be modeled, including a representation of a plurality of data points. More particularly, a suitable SLA and associated computer on which a suitable CAD application resides is loaded with a digital expression of the structure to be modeled, preferably in three-dimensional coordinates. In the case of a protein as the subject structure, digital expressions of many known proteins are available for downloading from the Protein Data Bank in a three dimensional space using a suitable CAD application.

Figure 3:
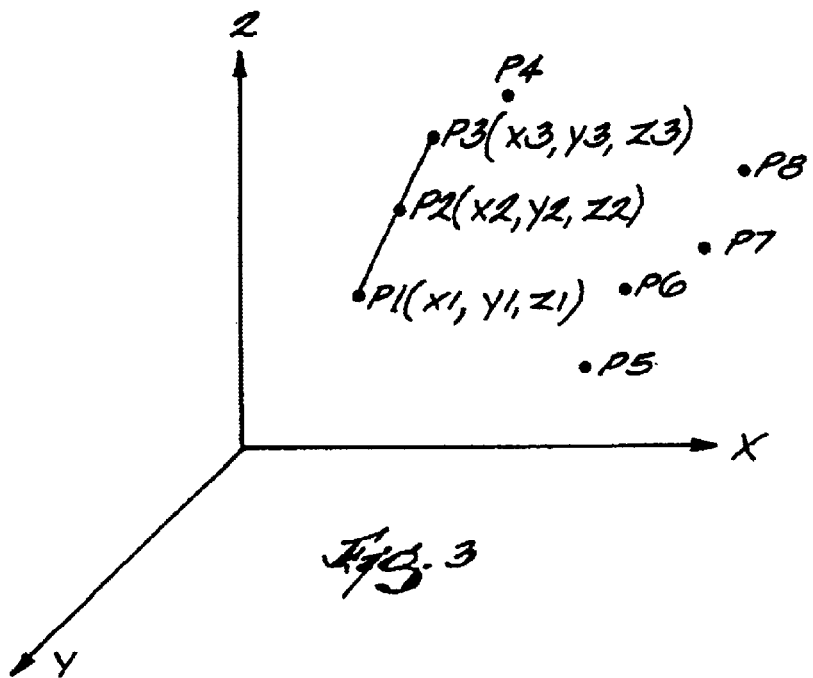
FIG. 3 is a schematic view of three-dimensional coordinates used to construct the model shown in FIG. 1.

The method of producing the model also includes selecting 404 a subset of data points from the plurality of data points available in the general digital representation of the subject structure. In particular, and as shown in FIG. 3, the subset of coordinates or data points P correlate to the selected characteristics of the structure to be modeled, such as the alpha carbons of the protein structure. Each data point of the subset of points has a respective x, y, and z coordinate. This subset of data points P is identified and separated from the general digital representation with the individual data points P being maintained in sequential order and are introduced into the CAD three-dimensional in sequential order. This subset of data points serves as a framework for a virtual representation of the subject structure. As explained below, the points P delineate paths corresponding to the chains of monomers found in the protein structure being modeled. When the model is fabricated, a strand 14 will generally lie along the path delineated by a set of points P.

The method of producing the model also includes generating 406 a representation of a structural element extending between at least two of the data points in the subset of data points. In particular, the virtual representation of the respective relative locations of the alpha carbons is extended by generating a plurality of virtual connecting segments extending between each adjacent coordinates, thus representing the covalent bond between adjacent alpha carbons. FIG. 3 illustrates this virtual connection of a plurality of data points P. For example, point P1 located at $X_1, Y_1, Z_1$ is spaced from point P2 located at $X_2, Y_2, Z_2$. A virtual segment extends along the path delineated by and extending between points P1 and P2. These virtual segments, when the model 10 is fabricated in the manner discussed below, corresponds to one of the elongated strands 14. Second and subsequent virtual segments are generated along a second path delineated by a second set of data points and correspond to second and subsequent strands 14.

Thus, as the virtual representation of the model is extended point-by-point through the entire subset of data points, a virtual representation of the backbone model 10 is generated in the CAD environment. Preferably, this virtual representation is maintained in a ".stl" file, a format that is commonly used in connection with SLA systems.

The method of producing the model 10 also includes generating 408 the representation of the support structure, i.e., the thin legs 26 corresponding to the forces of the hydrogen bonds. In particular, from the .stl file representing the relative locations of alpha carbons and presence of covalent bonds, the coordinates corresponding to selected alpha carbons that share a hydrogen atom, and therefore have therebetween a hydrogen bond, are designated by pairs or end points. The CAD system is then used to generate a virtual representation of a thin leg 26 extending between the pairs of end points. The representations of the legs 26 can be maintained either in a separate .stl file representing the hydrogen bonds only or in a set of additional coordinates in the .stl file for the backbone model.

In order to fabricate the model as a integrally formed, single piece of material, the SLA is used to generate the strands 14 and connecting legs 26. While any suitable configuration of the strands 14 and connecting legs 26 can be used successfully, in the illustrated embodiment, the strands 14 are formed to have a generally tubular outer surface and a generally circular cross-section when viewed in a plane extending perpendicular to the axis of the strand. Other outer surface and cross-sectional configurations can be generated depending on the capabilities of the SLA used and the intended use of the model.

Figure 10:
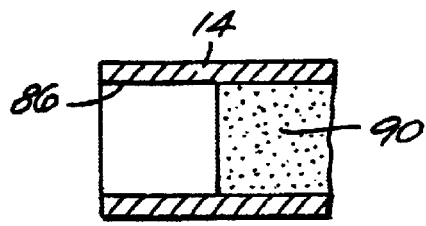
FIG. 10 is a cross-sectional view of a portion of the model shown in FIG. 1.

The strands 14 may be fabricated or built up by the SLA so as to be solid. However, in the alternative and as shown in FIG. 10, the strands 14 can also be made so as to provide a hollow tubular structure 86. The hollow strands can be left hollow, such as at hollow portion 86 or can be filled with a variety of filler materials, such as with filler material 90, depending on the intended purpose of the model. For example, multi-colored filler materials may be used for different strands 14 or portions of strands 14. Similarly, filler materials that vary the characteristics of the model 10, e.g., flexible materials, materials effecting the density or weight, or the hydrophobic or hydrophilic properties of the model may also be used as filler material 90.

The resultant model 10 is a solid free form model of a complex structure having a plurality of elements in spaced relation and forces acting on the elements. The model 10 represents the subject structure by including a plurality of strands 14 extending along a path corresponding to the location of respective elements along a path and by including a connecting leg which is integrally formed with the strands and which corresponds to the vector along which a force acts on the elements. The model is a single piece of material that accurately represents a variety of characteristics of the subject structure in a useful manner.

Figure 9:
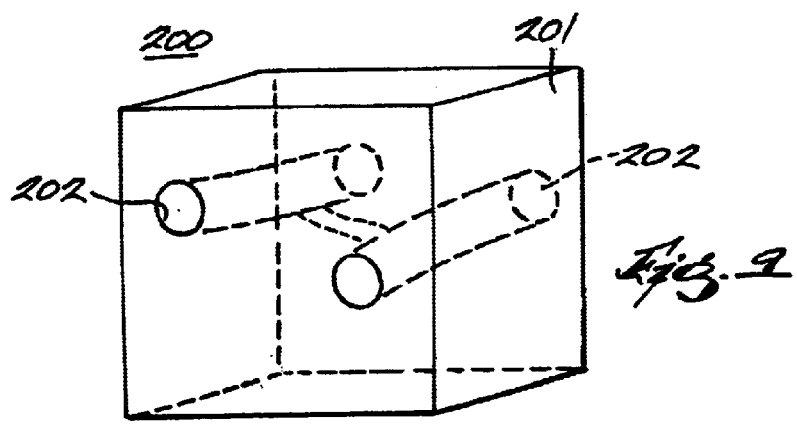
FIG. 9 is a perspective view of a model which is an alternative embodiment of the model shown in FIG. 1.

FIG. 9 illustrates a model 200 that is an alternative embodiment of the model 10. The model 200 is a reverse image of a model 10 in that the model 200 is generated through SFF techniques, but defines a three-space in which the modeled structure resides. This three-space is then formed as a solid form 201 shown in the drawings as a cube, though any configuration could be used. The solid 201 has extending therethrough a plurality of tunnels 202 which correspond to the structure of the stands 14 and connecting legs 26 in the model 10. The production of a model 200 is the same as that for model 10 in that the representing and fabricating steps are the same, but result in negative images of the structure illustrated in model 10.

FIGS. 4–7 illustrate a portion of a model 99 that is an alternative embodiment of the model 10. When assembled, the model 99 is identical in appearance to the model 10, but differs from the model 10 by virtue of being capable of being disassembled. More particularly, in order to enhance the manufacturability of the model 10, the strands 14 of model 99 are segmented or divided into a plurality of segments 40 that can be independently formed and fitted together to assemble the model 99 as a whole. The subdivision of the model 99 is carried out with the intention that the respective geometries of the segments 40 will afford relatively easy manufacture by injection molding or other manufacturing process, but without subdividing the model 99 into an excessive number of segments 40. For segments which have short "alpha helices" or severe turns or twists, the segments can be broken down into smaller fragments, so that the geometry of each segment 40 is simplified to the point that they can be easily molded.

More particularly, the model 99 includes strands 14 that are segmented and include at least two strand segments 40. The segments 40 have respective ends 46, which are adapted to be interconnected, but which also afford easy assembly and disassembly of the segments 40. The ends 46 of the segments 40 are configured so as to provide a means 50 for interconnecting the segments 40 into the model 99 as a whole, without the possibility of interconnecting the segments 40 improperly so as to form an inaccurate model configuration. While any suitable means 50 for interconnecting the segments can be successfully used, in the embodiment illustrated in FIG. 4, such interconnecting means 50 includes a pair of slide connectors 58, which are integrally formed into the respective ends 46 of adjacent strand segments 40, and which are configured to cooperate in the assembly of the segments 40 into the model 99. These pairs of slide connectors 58 are oriented relative to the unique geometry of the associated segment 40 to allow casting of the segment 40 individually by one of any suitable manufacturing process, such as injection molding.

With reference to FIGS. 5 and 6, the pairs of slide connectors 58 each include a male connector 60 on the end 46 of a first segment 40 and a respective female connector 62 on the end 46 of a second segment 40. The male connector 60 provides a first engagement surface 64 which has (FIG. 5) opposed faces 66. The engagement surface 64 on the male connector is sedge-shaped, in that the opposed faces 66 are not uniformly spaced apart across the diameter of the segment 40. Rather, the opposed faces 66 diverge from a leading edge 68 to a trailing edge 70. Also, the male connector engagement surface 64 also defines a neck and bulb portion 72 at the end of the male connector 60.

The female connector 62 also provides a pair of engagement surfaces 74 defining an opening or slot 76 adapted to receive the male connector 60. The engagement surfaces 74 defining the opening 76 are not uniformly spaced apart. Rather, the opening diverges from a leading edge 78 to a trailing edge 80, so that the leading edge 68 of the male connector 60 can be received by the opening 76, but cannot pass through the slot 76. Similarly, the male connector 60 can be received by the female connector 62 only by having the leading edges 68, 78 of the connectors 60 and 62 aligned. The engagement surfaces 74 also receive the neck and bulb portion 72 of the male connector 60 and converge to the end 46 of the female connector 62 to prevent axial displacement of the segments 40. As discussed below, the engagement surfaces 66 and 76 of the slide connectors 58 may be uniquely configured to assure that the pairs of connectors 60 and 62 can be interconnected in only one possible arrangement. This can be done, for example, by providing unique configurations of the neck and bulb portions 72 and slots 76.

The slide connectors 58 must accurately orient one segment 40 relative to the other and provide sufficient stability to the fully assembled model 99 such that the fully assembled model 99 can be handled without falling apart unintentionally.

With reference to FIG. 7(a), the connecting means 50 can take a variety of forms, including pairs of male and female end connectors 80, 84 that are configured to be interconnected in a single orientation. As shown in FIG. 7(a), the end connectors 80, 84 include a male portion 80 on the end of a first segment 40A and a respective female connector 84 on the end of a second segment 40B. The slide connectors 80, 84 must also accurately orient one segment relative to the other and provide sufficient stability to the fully assembled model 99 such that the fully assembled model can be handled without falling apart unintentionally, and can also be configured so that only the appropriate pairs of connectors can be assembled so as assure an accurate model 99.

The connecting means 50 may also take the form of a living hinge 100, as illustrated in FIG. 7(b). The living hinge 100 includes a first hinge half 102 coupled between a first segment 104 and a second hinge half 106. The second hinge half 106 is coupled between the first hinge half 102 and a second segment 108. The living hinge 100 may include a male engagement surface 110 in the shape of a half sphere in the first segment 104, and a female engagement surface 112 in the second segment 108 adapted to receive the male engagement surface 110. The male engagement surface 110 may be press fit into the female engagement surface 112 in order to secure the first segment 104 to the second segment 108. The living hinge 100 allows the first segment 104 to partially separate from and to move with respect to the second segment 108, but prevents the first segment 104 from completely separating from the second segment 108.

The model 99 also includes connecting legs 26 which represent the presence of a hydrogen bond. However, in order to make the model 99 easier to fabricate on a mass manufacturing scale, the model 99 includes connecting legs that are short, individual segments having opposite ends. The ends are received in respective recesses 48 in the segments 40. The recesses 48 are appropriately located along the length of the segments 40 to accurately represent the locations of the hydrogen bonds, and are aligned with respective recesses in adjacent strands 14 of segments 40 so that the both ends of the legs 26 are received by a recess 48.

A method of producing the model 99 includes (FIG. 8) segmenting 410 the virtual representation of the model 10. Segmenting includes identifying and generating representations of the strands 14 and the break points in the strands to generate representations of the segments 40 and connectors 58. The strand segments 40 are preferably formed through first representing the segments 40 in the CAD environment by introducing breaks in the strands 14. The breaks introduced into the protein backbone model 10 to create the individual segments 40 are preferably positioned along the length of a tubular strand 14 and between the bends A representing the location of two adjacent alpha carbons.

After the position of each break point has been determined in the virtual representation of the backbone model in the CAD environment, the break points are generated by defining pairs of slide connectors 58 on the ends of adjacent segments 40. This is preferably accomplished by generating a shape similar to the interface between the engagement surfaces 66, 74 of the end connectors 58. This particular shape of the interface unique to the specific set of connectors 58 is used as a "Boolean separator" created in the CAD environment and positioned in the backbone at a predetermined break point. The Boolean separator is a device that eliminates the data points in the generated image of a strand 14 and defines the cooperating engagement surfaces 66, 74 of the slide connector 58. A series of Boolean operations produces two segments 40 of a strand, with each segment having an end defining a female connector 62 and an opposite end having the male connector 60.

The manufacturability of the segments 40 must be considered in defining the slide connectors 58 for each segment end 46, especially if the segments 40 are intended to eventually be manufactured by injection molding. In particular, while the male end 60 of the slide connector pair 58 can be cast in any suitable orientation with respect to the orientation of the segment 40 and the draft angles on the male engagement surfaces 66, care must be taken to properly orient the female slide connector engagement surfaces 74 relative to the path of separation of the mold used to form the segment 40 and relative to the orientation of the remaining length of the segment 40. In particular, the female slide connector 62 must be oriented so that when the segment 40 in is an injection mold, the axis of the slot 76 in the female end is parallel to the path in which the moveable mold half is removed from the fixed mold. That is, two geometrical constraints on the placement of the segment 40 in the mold must be satisfied at the same time: the slot 76 at the female slide connector 62 of the segment 40 must be parallel to the path of mold separation, and the segment 40 must be positioned so as to allow its own unique geometry to allow mold separation. These two conditions can be met simultaneously by simply rotating the orientation of the engagement surfaces 66, 74 about the axis of the segment 40 connecting the two alpha carbons such that the axis of the slot 76 is parallel to the path of mold separation when the segment 40 is optimally positioned on the bottom mold half.

After the segments 40 of the model 99 are virtually represented, the method of producing the model 99 includes (FIG. 8) fabricating 412 the segments 40. This fabricating step includes initially fabricating the segments of the model 99 through the use of stereolithography (SLA) to produce the plurality segments 40. Thereafter, the method for producing the model 99 includes (FIG. 8) assembling 414 the backbone segments 40 with the end connectors 58 and the connecting legs 26 in the recesses 48 into the final model 99. When so assembled with SLA fabricated parts, the model 99 provides an opportunity to evaluate the model and to assure the accuracy and representation of the model 99. Any modifications in the parts of the model 99 can then be carried out before manufacturing tooling is fabricated. Once the model segments 40 are properly configured, then the method of producing the model 99 includes fabricating the tooling for mass manufacture of the model segments 40 by, for example, injection molding and assembling the mass produced segments. The method of producing the model 99 may also include color-coding the model 99 according to an atomic color scheme, such as the CPK color scheme described with respect to the model 10.

Figure 11A:
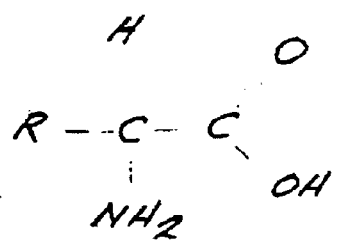
FIG. 11($a$) illustrates the chemical structure of an amino acid.
Figure 11B:
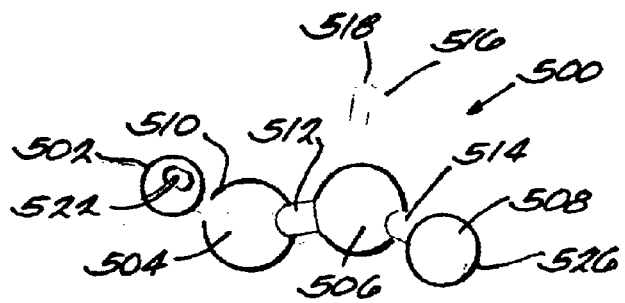

FIGS. 11–15 illustrate a particular embodiment of the invention in the form of a macro-molecule construction kit. By way of example only, the macro-molecule construction kit may be an alpha helix construction kit, a parallel beta sheet construction kit, or an anti-parallel beta sheet construction kit. Each of the macro-molecule construction kits includes an amino acid backbone unit 500 representing an assembly of atoms that forms a single amino acid. The chemical structure of a single amino acid represented by the amino acid backbone unit 500 is shown in FIG. 11(*a*). As shown in FIGS. 11(*b*) and 11(*c*), the amino acid backbone unit 500 includes four spherical members representing four atoms and four tubular members representing bonds between the atoms. A first spherical member 502 represents a nitrogen atom, a second spherical member 504 represents an alpha carbon atom, a third spherical member 506 represents a carbonyl carbon atom, and a fourth spherical member 508 represents an oxygen atom. A first tubular member 510 couples the first spherical member 502 to the second spherical member 504, a second tubular member 512 couples the second spherical member 504 to the third spherical member 506, and a third tubular member 514 couples the third spherical member 506 to the fourth spherical member 508. Tubular members 510, 512, and 514 preferably each have a cylindrical shape representing a covalent bond between the atoms. A fourth tubular member 516 is coupled to the third spherical member 506. The fourth tubular member 516 includes a male engagement surface 518 having a double cylindrical shape, which represents a covalent peptide bond between the carbonyl carbon atom of one amino acid and the nitrogen atom of another amino acid.

As shown in FIG. 11(*c*), the first spherical member 502 representing the nitrogen atom includes a first female engagement surface 520, preferably in the form of a cylindrical aperture. The first female engagement surface 520 may also be another shape, such as square or triangular. As shown in FIG. 11(*b*), the first spherical member 502 also includes a second female engagement surface 522, preferably in the form of a double cylindrical aperture. The second female engagement surface 522 is adapted to accept the double cylindrical shape of the male engagement surface 518 of another amino acid backbone unit 500. Due to the double cylindrical aperture of the female engagement surface 522 and the double cylindrical shape of the male engagement surface 518, the fourth tubular member 516 of one amino acid backbone unit 500 can only be coupled to the first spherical member 502 of another amino acid backbone unit 500 in one of two orientations. The second female engagement surface 522 may also be another shape, such as a double triangular shape, as long as the shape prevents the coupling of one amino acid backbone unit 500 to another amino acid backbone unit 500 in more than two orientations.

As shown in FIG. 11(*c*), the second spherical member 504 representing the alpha carbon atom includes a female engagement surface 524 preferably in the form of a cylindrical aperture. Preferably, the cylindrical aperture of the female engagement surface 524 of the second spherical member 504 has a different circumference than the first female engagement surface 520 of the first spherical member 502. Most preferably, the female engagement surface 524 of the second spherical member 504 is in the form of a substantially larger cylindrical aperture than the cylindrical aperture of the first female engagement surface 520.

As shown in FIG. 11(*b*), the fourth spherical member 508 representing the oxygen atom includes a female engagement surface 526, preferably in the form of a cylindrical aperture. Preferably, the female engagement surface 526 of the fourth spherical member 508 has the same shape as the first female engagement surface 520 of the first spherical member 502 representing the nitrogen atom.

Figure 11C:
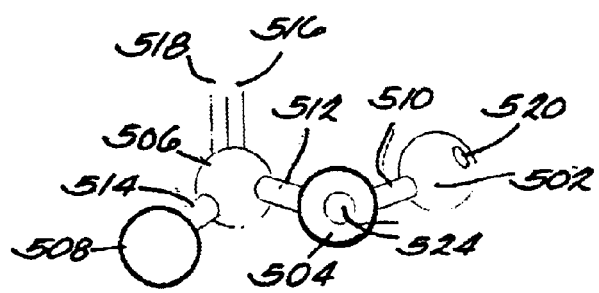
Figure 12A:
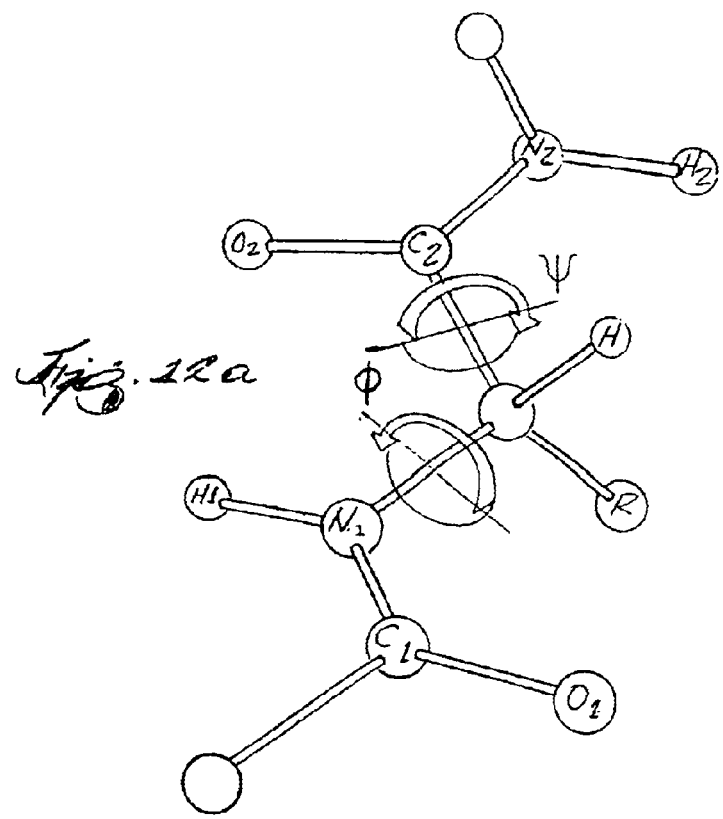
FIG. 12($a$) illustrates the chemical structure of two amino acids bonded together.

FIG. 12(*a*) illustrates two amino acids joined to form a di-peptide backbone. FIG. 12(*a*) also illustrates two angles of rotation around two bonds that flank the alpha carbon atom, namely a phi angle ($\phi$) and a psi angle ($\omega$). The phi angle is the angle of rotation about the bond between the nitrogen atom and the alpha carbon atom of the amino acid. The psi angle is the angle of rotation about the bond between the alpha carbon atom and the carbonyl atom of the amino acid. The phi and psi angles of the amino acid backbone define the path of the backbone in three-dimensional space. Depending on the phi and psi angles of the amino acid backbone units 500, the macro-molecule construction kit may be an alpha helix construction kit, a parallel beta sheet construction kit, or an anti-parallel construction kit. For the alpha helix construction kit, as shown in FIGS. 11, 12, and 15, the phi angle is approximately negative 57 degrees and the psi angle is approximately negative 47 degrees. For the parallel beta sheet construction kit (not shown), the phi angle is approximately negative 119 degrees and the psi angle is approximately positive 113 degrees. For the anti-parallel beta sheet construction kit (not shown), the phi angle is approximately negative 139 degrees and the psi angle is approximately positive 135 degrees.

Figure 12B:
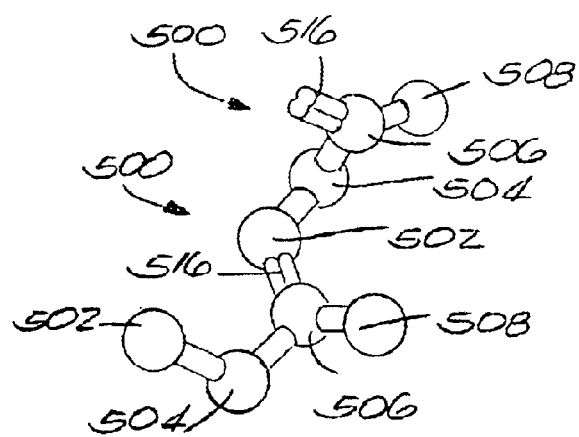

FIG. 12(b) illustrates two amino acid backbone units 500 coupled together, representing a di-peptide alpha helix backbone. The fourth tubular member 516 of one amino acid backbone unit 500 is coupled to the second female engagement surface 522 of another amino acid backbone unit 500, representing the covalent peptide bond between the nitrogen atom of one amino acid and the carbonyl carbon atom of another amino acid. The double spherical shape of the fourth tubular member 516 represents a delocalized electron pair and only allows the fourth tubular member 516 to be inserted into the second female engagement surface 522 in one of two orientations.

Figure 13A:
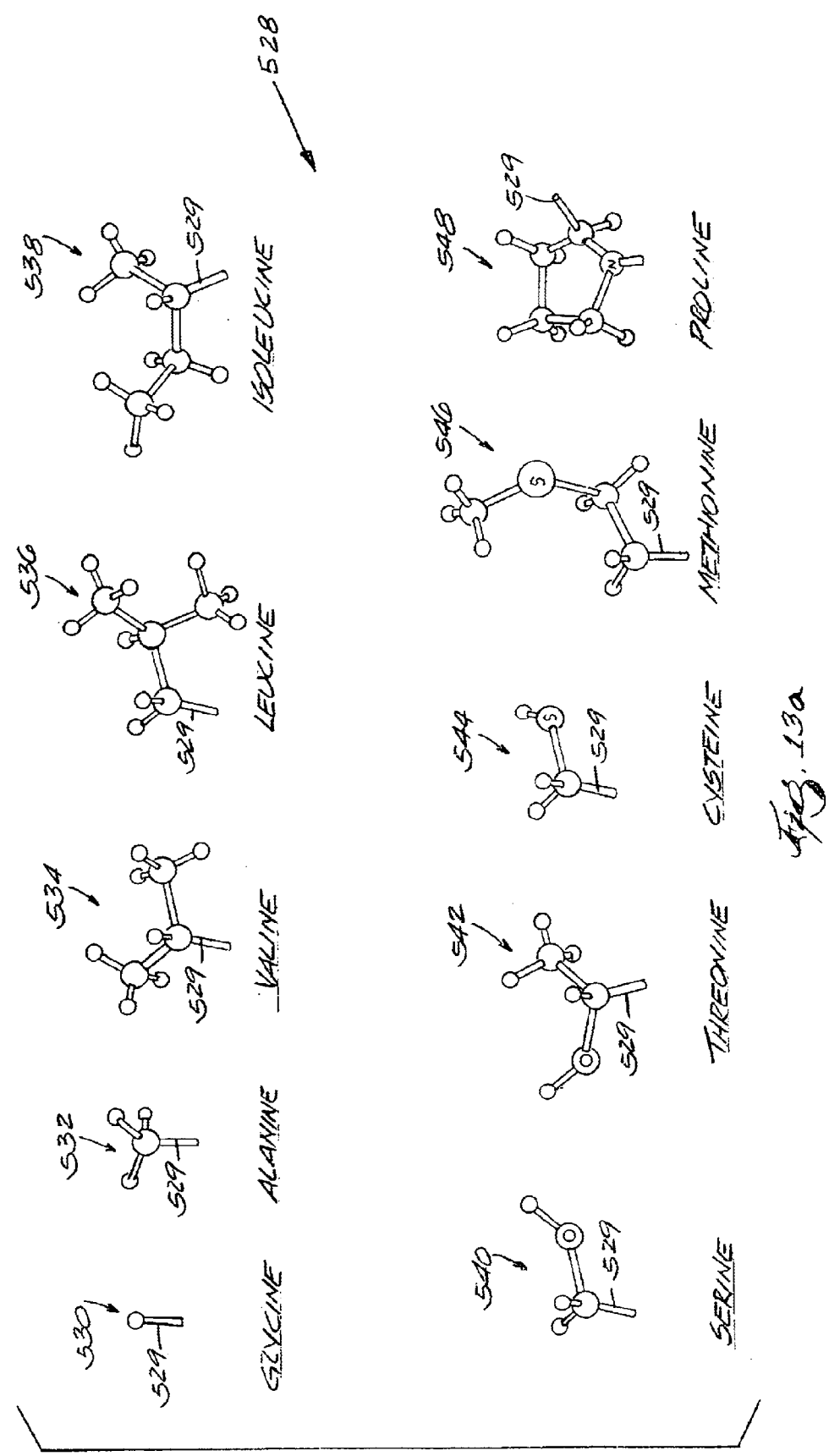
FIGS. 13($a$), 13($b$), and 13($c$) illustrate twenty amino acid side chain units.
Figure 13C:
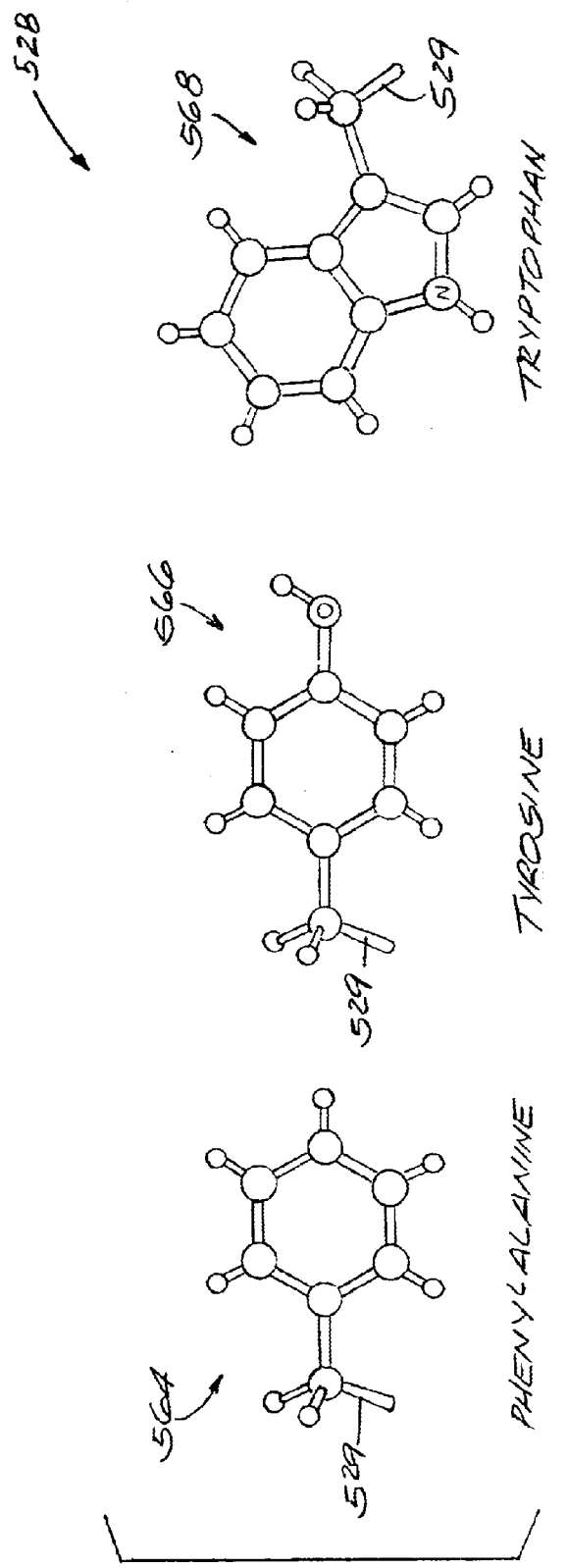

In addition to the amino acid backbone unit 500, the macro-molecule construction kit includes twenty individual side chain units 528, as illustrated in FIGS. 13(a), 13(b), and 13(c). The twenty side chain units 528 represent the twenty different amino acids that make up proteins. Each one of the side chain units 528 represents a different assembly of atoms for each of the amino acid side chains. Each one of the side chain units 528 is constructed in a similar manner as the amino acid backbone unit 500, in that spherical members represent atoms and tubular members represent bonds between the atoms. In addition, each one of the side chain units 528 includes a tubular member 529 having a cylindrical shape adapted to be coupled to the female engagement surface 524 of the second spherical member 504, as shown in FIG. 11(c), of each one of the amino acid backbone units 500. The side chain units 528 coupled to the second spherical member 504 of each one of the amino acid backbone units 500 represents the bond between alpha carbon atoms and amino acid side chains. The twenty side chain units 528 include a glycine unit 530, an alanine unit 532, a valine unit 534, a leucine unit 536, a isoleucine unit 538, a serine unit 540, a threonine unit 542, a cysteine unit 544, a methionine unit 546, a proline unit 548, an aspartic acid unit 550, an asparagine unit 552, a glutamic acid unit 554, a glutamine unit 556, a lysine unit 558, an arginine unit 560, a histidine unit 562, a phenylalanine unit 564, a tyrosine unit 566, and a tryptophan unit 568.

Figure 14:
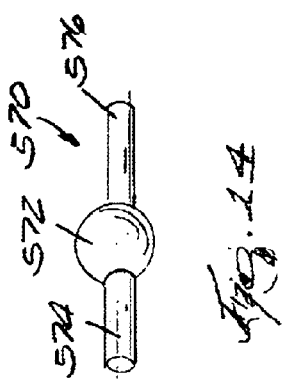
FIG. 14 is a perspective view of a hydrogen bond unit.

In addition to the amino acid backbone units 500 and the side chain units 528, the macro-molecule construction kit includes hydrogen bond units 570, as illustrated in FIG. 14. The hydrogen bond unit 570 includes a spherical member 572 representing a hydrogen atom, a first male engagement surface 574 representing one half of a hydrogen bond, and a second male engagement surface 576 representing the other half of a hydrogen bond. The first male engagement surface 574 and the second male engagement surface 576 preferably lie within a straight line. The first male engagement surface 574 and the second male engagement surface 576 of the hydrogen bond units 570 are adapted to be inserted into the first female engagement surface 520 of the first spherical member 502 and the female engagement surface 526 of the fourth spherical member 508 of each one of the amino acid backbone units 500. The hydrogen bond unit 570 coupled to the first spherical member 502 of one amino acid backbone unit 500 and the fourth spherical member 508 of another amino acid backbone unit 500 represents the hydrogen bond between the nitrogen atom of one amino acid and the oxygen atom of another amino acid.

Figure 15C:
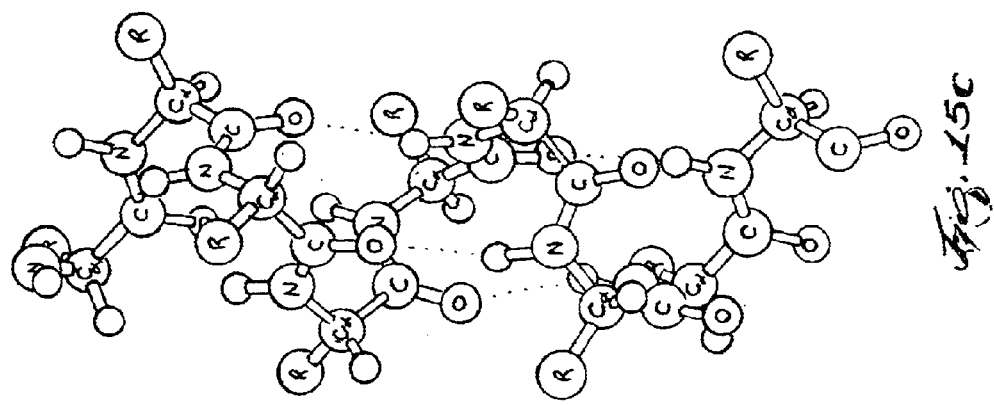
FIG. 15($a$) illustrates the alpha carbon atoms of an alpha helix.
Figure 15B:
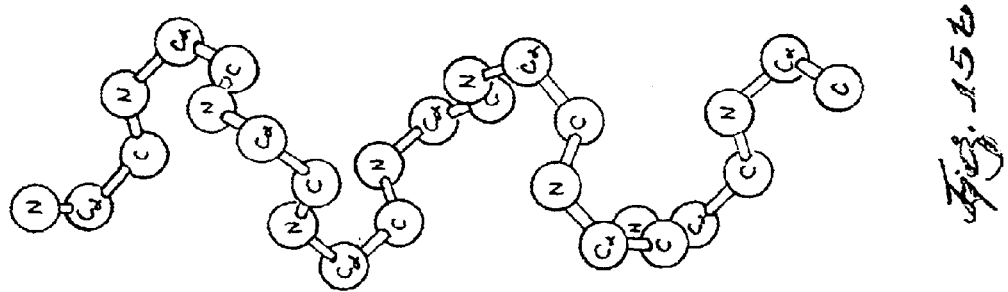
Figure 15A:
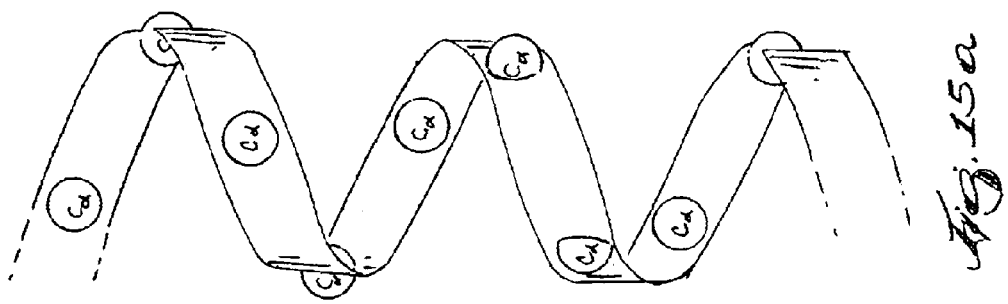

FIG. 15 illustrates three representations of an alpha helix. FIG. 15(a) illustrates only the alpha carbon atoms (labeled "$C_\alpha$") of the alpha helix joined by a ribbon to depict the right-handed helical structure of the alpha helix that results from a 100 degree rotation of the helix between each alpha carbon. Each turn of the alpha helix requires 3.6 alpha carbons. FIG. 15(b) illustrates the alpha carbon atoms, the nitrogen atoms (labeled "N"), and the carbonyl carbon atoms (labeled "C") of the alpha helix, and also depicts the helical structure of the alpha helix. FIG. 15(c) illustrates the nitrogen atoms, the alpha carbon atoms, the carbonyl atoms, the oxygen atoms (labeled "O"), the side chains (labeled "R"), and the hydrogen bonds (illustrated with dotted lines) of the alpha helix. For the alpha helix construction kit, the side chain units 528 are coupled to the amino acid backbone units 500 in the manner in which the side chains are depicted in FIG. 15(c). In addition, the hydrogen bond units 570 are coupled between the amino acid backbone units 500 in the manner in which the hydrogen bonds are depicted in FIG. 15(c). The hydrogen bond units 570 coupled between the amino acid backbone units 500 represents the stabilization of the alpha helix that results from the hydrogen bonding network within the alpha helix.

In one preferred embodiment, the alpha helix construction kit includes 47 individual units. The alpha helix construction kit is preferably comprised of twelve amino acid backbone units 500, fifteen hydrogen bond units 570, and twenty side chain units 528. When assembled the alpha helix construction kit represents one and a half turns of a right-handed alpha helix.

Figure 30:
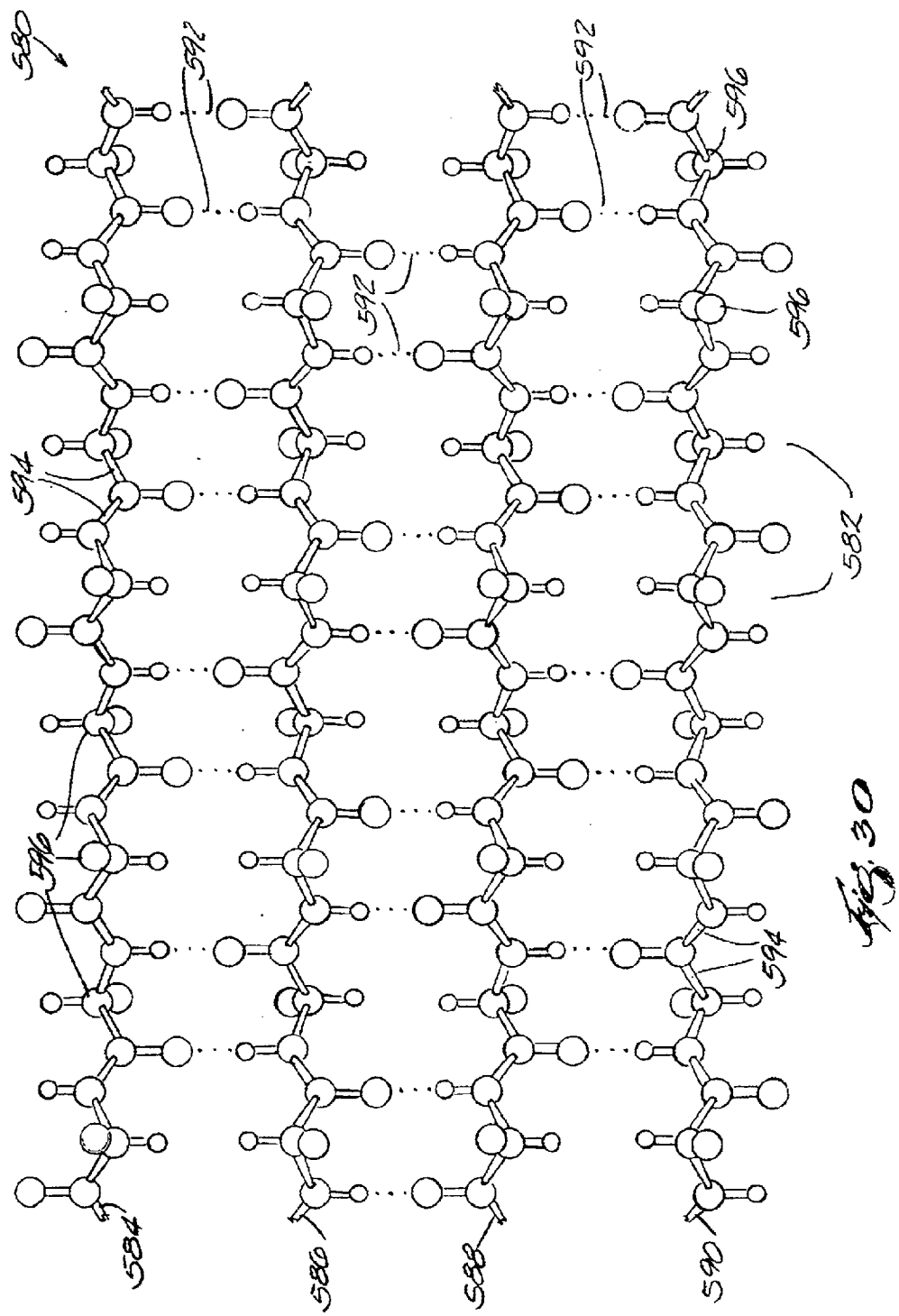
FIG. 30 illustrates a beta sheet structure.

FIG. 30 illustrates a beta sheet structure 580 for a beta sheet construction kit. The beta sheet structure 580 consists of a polymer of amino acids in which each strand of the sheet exists as an extended structure with a zigzag shape, i.e., a pleated sheet structure. Adjacent strands of the beta sheet structure 580 may be parallel or anti-parallel to each other. The beta sheet structure 580 includes amino acids 582. Each individual amino acid 582 has the same structure as the amino acid backbone units 500 illustrated in FIGS. 11 and 12, but with different phi and psi angles. For a parallel beta sheet, the phi angle is approximately negative 119 degrees and the psi angle is approximately positive 113 degrees. For an anti-parallel beta sheet, the phi angle is approximately negative 139 degrees and the psi angle is approximately positive 135 degrees. The beta sheet structure 580 includes several amino acids 582 bonded via peptide bonds 594 to form, for example, four amino acid strands 584, 586, 588, and 590. Strand 584 is bonded to strand 586, strand 586 is bonded to strand 588, and strand 588 is bonded to strand 590 via hydrogen bonds 592. The hydrogen bonds 592 stabilize the beta sheet structure 580 by joining nitrogen atoms from one strand to carbonyl carbon atoms of another strand. The peptide bonds 594 between each of the atoms of the amino acids 582 lie in the plane of the pleated sheet, while side chains 596 lie above or below the pleated sheet and alternate along the strands.

In one preferred embodiment, the beta sheet construction kit includes 104 individual units. The beta sheet construction kit preferably includes amino acid backbone units similar to the amino acid backbone units 500, except that the phi and psi angles are different. The beta sheet construction kit also preferably includes the same hydrogen bond units 570 and the same side chain units 528 as the alpha helix construction kit. The beta sheet construction kit includes twenty-eight parallel amino acid backbone units, twenty-eight antiparallel amino acid backbone units, twenty hydrogen bond units 570, and twenty-eight side chain units 528. The beta sheet construction kit may be assembled into either a parallel beta sheet or an anti-parallel beta sheet.

In one preferred embodiment of the macro-molecule construction kits, the spherical members of the amino acid backbone units 500, the side chain units 528, and the hydrogen bond units 570 are color-coded according to an atomic color scheme. A suitable atomic color scheme is the CPK color scheme in which gray represents carbon, white represents hydrogen, red represents oxygen, blue represents nitrogen, orange represents iron or phosphorus, and yellow represents sulfur.

FIGS. 16–29 illustrate another particular embodiment of the invention in the form of a nucleic acid construction kit. The nucleic acid construction kit may include four types of base units 600, each representing an assembly of atoms, in order to construct either a deoxyribonucleic acid (DNA) model or a ribonucleic acid (RNA) model. The nucleic acid construction kit may also include five types of base units 600 in order to construct both a DNA and a RNA model. Referring to FIGS. 16–19, for a DNA model, the base units 600 include a cytosine unit 602, a guanine unit 604, an adenine unit 606, and a thymine unit 608. Referring to FIGS. 16–18 and 20, for a RNA model, the base units 600 include a cytosine unit 602, a guanine unit 604, an adenine unit 606, and a uracil unit 610.

FIG. 16(*a*) illustrates the chemical structure of cytosine, and FIG. 16(*b*) illustrates the cytosine unit 602. The cytosine unit 602 includes eight spherical members 611 representing eight atoms and eight tubular members 613 representing bonds between the atoms. Spherical members 612, 614, 616, and 618 represent carbon atoms; spherical members 620, 622, and 624 represent nitrogen atoms; and spherical member 626 represents an oxygen atom. Spherical member 620 includes a female engagement surface 628 having a donor shape. The donor shape is preferably a dovetail shape including a base surface 630, two inner diagonal surfaces 632 and 634, and two outer diagonal surfaces 636 and 638. Spherical member 622 includes a female engagement surface 640 and spherical member 626 includes a female engagement surface 642. Female engagement surface 640 and 642 each have a receptor shape. The receptor shape is preferably an arrow shape including two arrow-head surfaces 644 and 646, two inner diagonal surfaces 648 and 650, and two outer diagonal surfaces 652 and 654. Spherical member 624 includes a female engagement surface 656 having a slide connector shape (as shown and described with respect to FIG. 6).

Figure 17A:
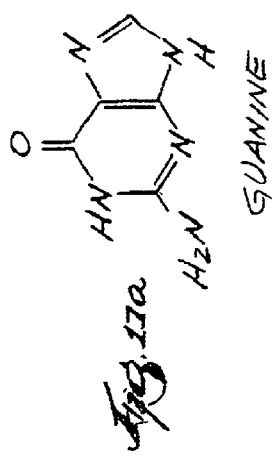
FIG. 17($a$) illustrates the chemical structure of guanine.
Figure 17B:
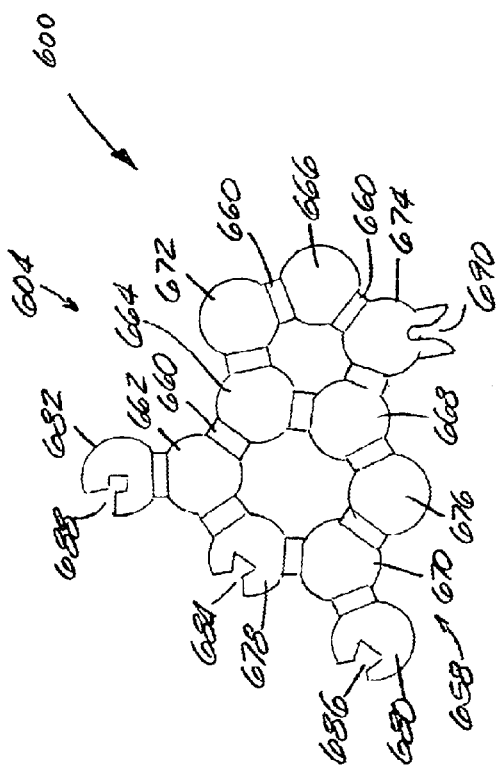

FIG. 17(*a*) illustrates the chemical structure of guanine, and FIG. 17(*b*) illustrates the guanine unit 604. The guanine unit 604 includes eleven spherical members 658 representing eleven atoms and twelve tubular members 660 representing bonds between the atoms. Spherical members 662, 664, 666, 668, and 670 represent carbon atoms; spherical members 672, 674, 676, 678, and 680 represent nitrogen atoms; and spherical member 682 represent an oxygen atom. Spherical members 678 and 680 each include female engagement surfaces 684 and 686, respectively, having the donor shape. Spherical member 682 includes a female engagement surface 688 having the receptor shape. Spherical member 674 includes a female engagement surface 690 having the slide connector shape.

Figure 18A:
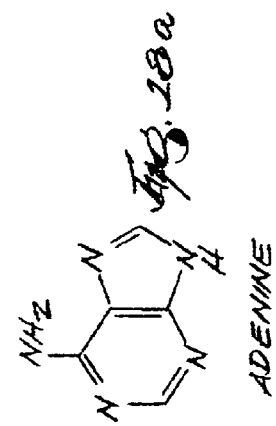
FIG. 18($a$) illustrates the chemical structure of adenine.
Figure 18B:
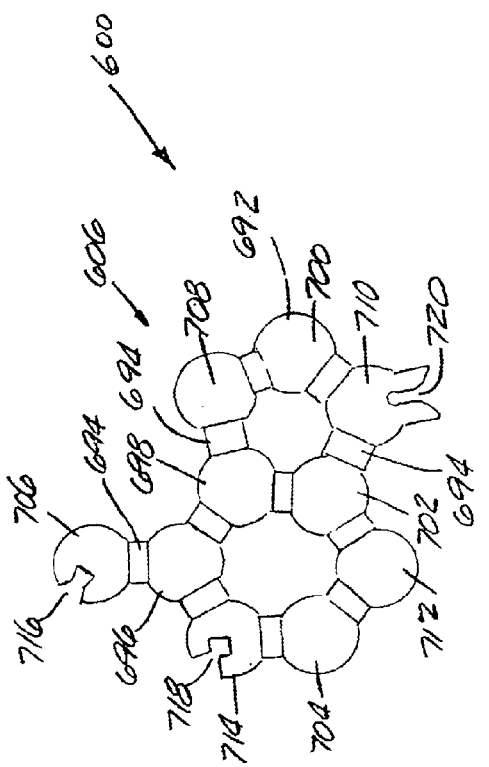

FIG. 18(*a*) illustrates the chemical structure of adenine, and FIG. 18(*b*) illustrates the adenine unit 606. The adenine unit 606 includes ten spherical members 692 representing ten atoms and eleven tubular members 694 representing bonds between the atoms. Spherical members 696, 698, 700, 702, and 704 represent carbon atoms; and spherical members 706, 708, 710, 712, and 714 represent nitrogen atoms. Spherical member 706 includes a female engagement surface 716 having the donor shape. Spherical member 714 includes a female engagement surface 718 having the receptor shape. Spherical member 710 includes a female engagement surface 720 having the slide connector shape.

FIG. 19(*a*) illustrates the chemical structure of thymine, and FIG. 19(*b*) illustrates the thymine unit 608. The thymine unit 608 includes nine spherical members 722 representing atoms and nine tubular members 724 representing bonds between the atoms. Spherical members 726, 728, 730, 732, and 734 represent carbon atoms; spherical members 736 and 738 represent nitrogen atoms; and spherical member 740 represent an oxygen atom. Spherical member 740 includes a female engagement surface 742 having the receptor shape. Spherical member 736 includes a female engagement surface 744 having the donor shape. Spherical member 738 includes a female engagement surface 746 having the slide connector shape.

Figure 20A:
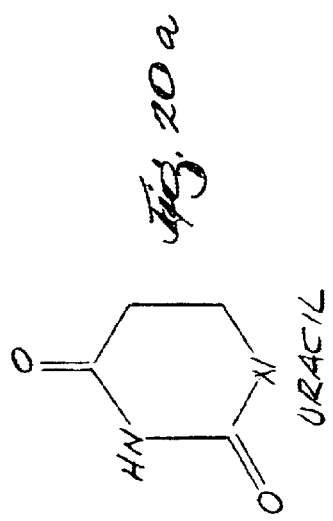
FIG. 20($a$) illustrates the chemical structure of uracil.
Figure 20B:
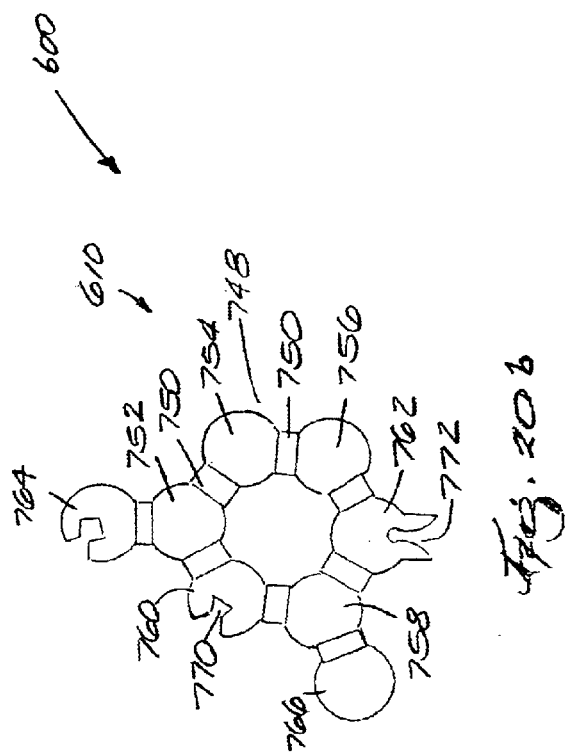

For the ribonucleic acid construction kit, the uracil units 610 take the place of the thymine units 608. However, a nucleic acid construction kit may include both uracil units 610 and thymine units 608. FIG. 20(*a*) illustrates the chemical structure of uracil, and FIG. 20(*b*) illustrates the uracil unit 610. The uracil unit 610 includes eight spherical members 748 representing atoms and eight tubular members 750 representing bonds between the atoms. Spherical members 752, 754, 756, and 758 represent carbon atoms; spherical members 760 and 762 represent nitrogen atoms; and spherical members 764 and 766 represent oxygen atoms. Spherical member 764 includes a female engagement surface 768 having the receptor shape. Spherical member 760 includes a female engagement surface 770 having the donor shape. Spherical member 762 includes a female engagement surface 772 having the slide connector shape.

FIG. 21 (*a*) illustrates the chemical structure of cytosine bonded to guanine, and FIG.(b) illustrates a cytosine unit 602 is coupled to a guanine unit 604. Three hydrogen bond units 800, representing hydrogen bonds, are coupled between the cytosine unit 602 and the guanine unit 604. Each hydrogen bond unit 800 includes a spherical member 802 coupled between a first male engagement surface 804 and a second male engagement surface 806. The first male engagement surface 804 has a receptor shape adapted to be inserted into the female engagement surfaces having the receptor shape, as described above, of each of the base units 600. The second male engagement surface 806 has a donor shape adapted to be inserted into the female engagement surface having the donor shape, as described above, of each of the base units 600. A hydrogen bond unit 800 couples spherical member 620 of the cytosine unit 602 to spherical member 682 of the guanine unit 604. A hydrogen bond unit 800 couples spherical member 622 of the cytosine unit 602 to spherical member 678 of the guanine unit 604. A hydrogen bond unit 800 couples spherical member 626 of the cytosine unit 602 to spherical member 680 of the guanine unit 604.

For the DNA construction kit, FIG. 22(*a*) illustrates the chemical structure of thymine bonded to adenine, and FIG. 22(*b*) illustrates the thymine unit 608 coupled to the adenine unit 606 via two hydrogen bond units 800. A hydrogen bond unit 800 couples spherical member 706 of the adenine unit 606 to spherical member 740 of the thymine unit 608. A hydrogen bond unit 800 couples spherical member 714 of the adenine unit 606 to spherical member 736 of the thymine unit 608. For the RNA construction kit, the uracil unit 610 is coupled to the adenine unit 606 in the same manner.

Figure 23A:
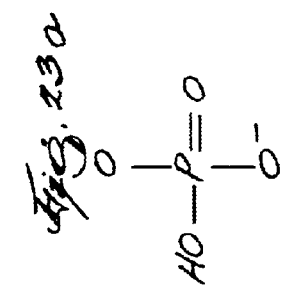
FIG. 23($a$) illustrates the chemical structure of a phosphate group.
Figure 23B:
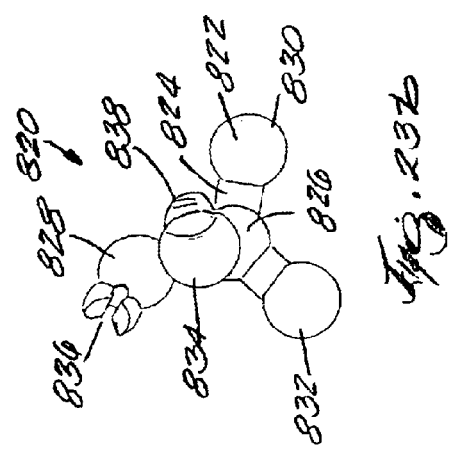

In addition to the base units 600 and the hydrogen bond units 800, the nucleic acid construction kits also include phosphate units 820 and sugar units 840. FIG. 23(a) illustrates the chemical structure for a phosphate group, and FIG. 23(b) illustrates a phosphate unit 820. The phosphate unit 820 includes five spherical members 822 representing five atoms in a tetrahedron configuration and four tubular members 824 representing bonds between the atoms. Spherical member 826 represents a phosphorus atom; and spherical members 828, 830, 832, and 834 represent oxygen atoms. Spherical members 828 and 834 each include a female engagement surface 836 and 838, respectively, having the slide connector shape.

Figure 24A:
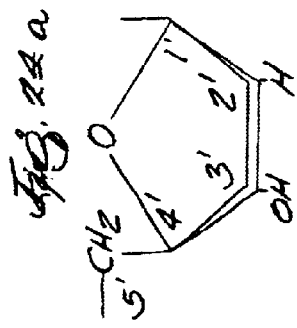
FIG. 24($a$) illustrates the chemical structure of deoxyribose.
Figure 24B:
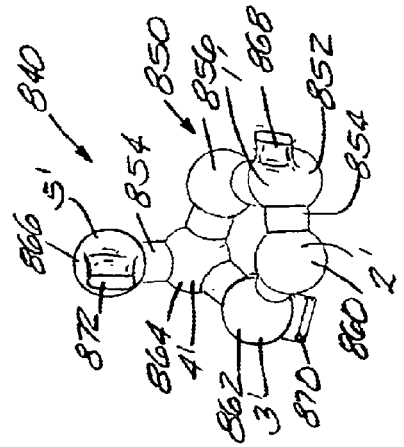

For the DNA construction kit, FIG. 24(a) illustrates the chemical structure of deoxyribose sugar, and FIG. 24(b) illustrates a deoxyribose unit 850. The deoxyribose unit 850 includes six spherical members 852 representing atoms and six tubular member 854 representing bonds between the atoms. Spherical member 856 represents an oxygen atom; and spherical members 858, 860, 862, 864, and 866 represent carbon atoms. Spherical members 858, 862, and 866 each include a male engagement surface 868, 870, and 872, respectively, having the slide connector shape.

Figure 25A:
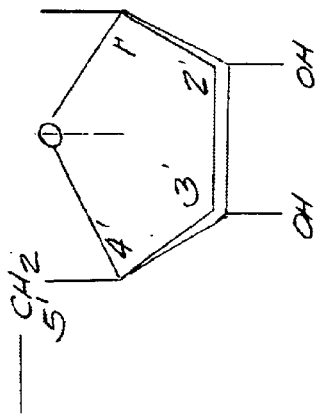
FIG. 25($a$) illustrates the chemical structure of ribose.
Figure 25B:
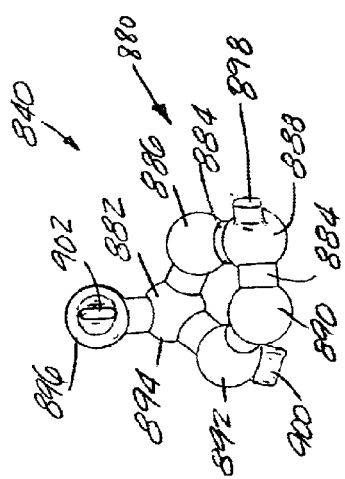

For the RNA construction kit, FIG. 25(a) illustrates the chemical structure of ribose sugar, and FIG. 25(b) illustrates a ribose unit 880. The ribose unit 880 includes six spherical members 882 representing atoms and six tubular member 884 representing bonds between the atoms. Spherical member 886 represents an oxygen atom; and spherical members 888, 890, 892, 894, and 896 represent carbon atoms. Spherical members 888, 892, and 896 each include a male engagement surface 898, 900, and 902, respectively, having the slide connector shape.

In one preferred embodiment of the nucleic acid construction kits, the spherical members of the base units 600, the hydrogen bond units 800, the phosphate units 820, and the sugar units 840 are color-coded according to an atomic color scheme. A suitable atomic color scheme is the Corey, Pauling, Kultin (CPK) color scheme in which gray represents carbon, white represents hydrogen, red represents oxygen, blue represents nitrogen, orange represents iron or phosphorus, and yellow represents sulfur.

Figure 26:
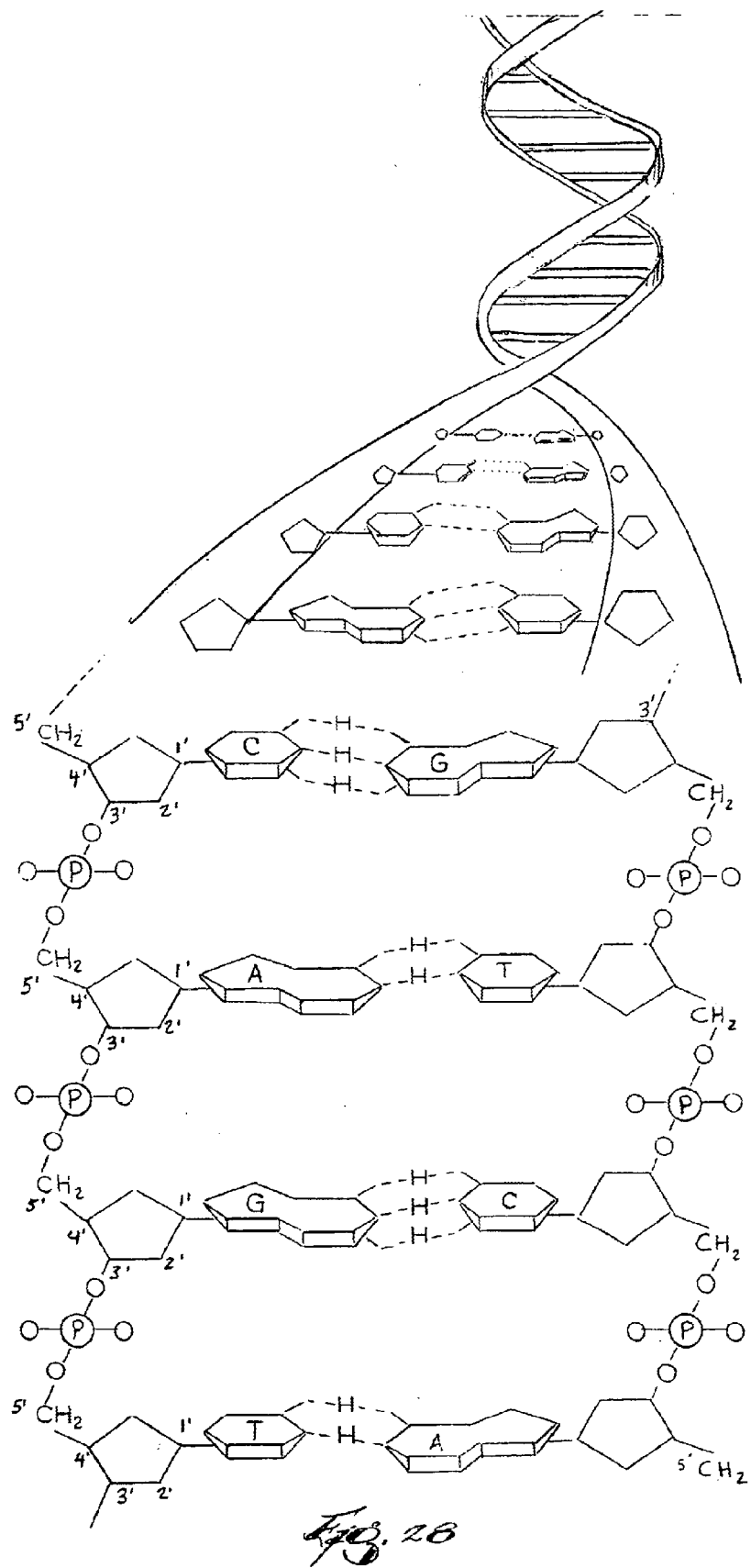
FIG. 26($a$) is a perspective view of two phosphate units coupled to a deoxyribose unit in a 5' to 3' configuration.

FIG. 26 illustrates three different ways in which the phosphate units 820 may be coupled to the sugar units 840. The phosphate units 820 and the sugar units 840 are constructed in a manner that allows them to be assembled in three different ways, although only one way leads to the double-helical DNA structure. FIG. 26(a) illustrates a 5' to 3' configuration, which is the only configuration that leads to the double-helical DNA structure. FIG. 28 illustrates the manner in which deoxyribose groups bond with phosphate groups and bases in order to form the 5' to 3' double-helical DNA structure. Specifically, one phosphate group bonds to a carbon atom in the 5' position and another phosphate group bonds to a carbon atom in the 3' position of the deoxyribose ring. Each base then bonds to a carbon atom in the 1' position of the deoxyribose ring.

For the DNA construction kit, as shown in FIG. 26(a), spherical member 834 of one phosphate unit 820 is coupled to spherical member 862 of a deoxyribose unit 850, representing a bond between a first phosphate group and a carbon atom in the 3' position of the deoxyribose ring. Spherical member 834 of another phosphate unit 820 is coupled to spherical member 866 of the deoxyribose unit 850, representing a bond between a second phosphate group and a carbon atom in the 5' position of the deoxyribose ring. Spherical member 858 of the deoxyribose unit 850 is coupleable to each one of the base units 600 in order to represent a bond between a carbon atom in the 1' position of the deoxyribose ring and one of the bases. When spherical member 858 is coupled to a base unit 600, a first plane including the ring of the deoxyribose unit 850 lies generally perpendicular to a second plane including the base unit 600.

FIG. 26(b) illustrates a 5' to 1' configuration. Although the 5' to 1' configuration is physically possible, the 5' to 1' configuration does not lead to a double-helical DNA structure and no molecules existing in nature have this structure. The 5' to 1' configuration is provided for in the DNA construction kit as an instructional tool for use in teaching students the structure of DNA. Rather than being able to assemble the units of the model in only one manner, the student is able to construct the model in one correct manner leading to the DNA structure and in two incorrect manners. Spherical member 834 of one phosphate unit 820 is coupled to spherical member 858 of the deoxyribose unit 850, representing a bond between a first phosphate group and a carbon atom in the 1' position of a deoxyribose ring. Spherical member 834 of another phosphate unit 820 is coupled to spherical member 866 of the deoxyribose unit 850, representing a bond between a second phosphate group and a carbon atom in the 5' position of the deoxyribose ring.

FIG. 26(c) illustrates a 3' to 1' configuration. Although the 3' to 1' configuration is physically possible, the 3' to 1' configuration does not lead to a double-helical DNA structure and no molecules existing in nature have this structure. Again, the 3' to 1' configuration is provided for in the DNA construction kit as an instructional tool for use in teaching students the structure of DNA. Spherical member 834 of one phosphate unit 820 is coupled to spherical member 858 of the deoxyribose unit 850, representing a bond between a first phosphate group and the carbon atom in the 1' position of the deoxyribose ring. Spherical member 834 of another phosphate unit 820 is coupled to spherical member 862 of the deoxyribose unit 850, representing a bond between a second phosphate group and a carbon atom in the 3' position of the deoxyribose ring.

Figure 27A:
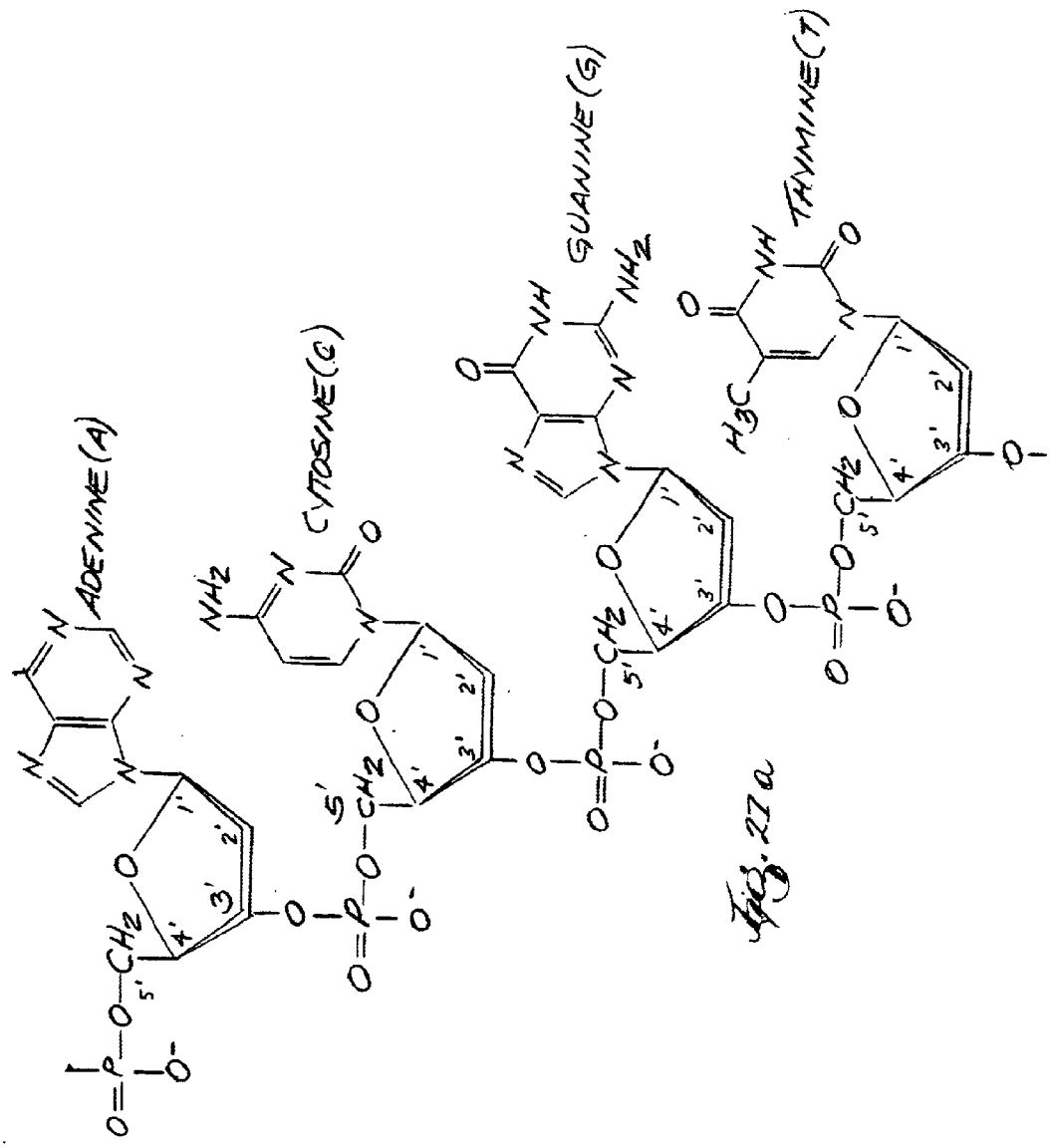
FIG. 27($a$) illustrates the chemical structure of a portion of a single deoxyribonucleic acid (DNA) helix.
Figure 27B:
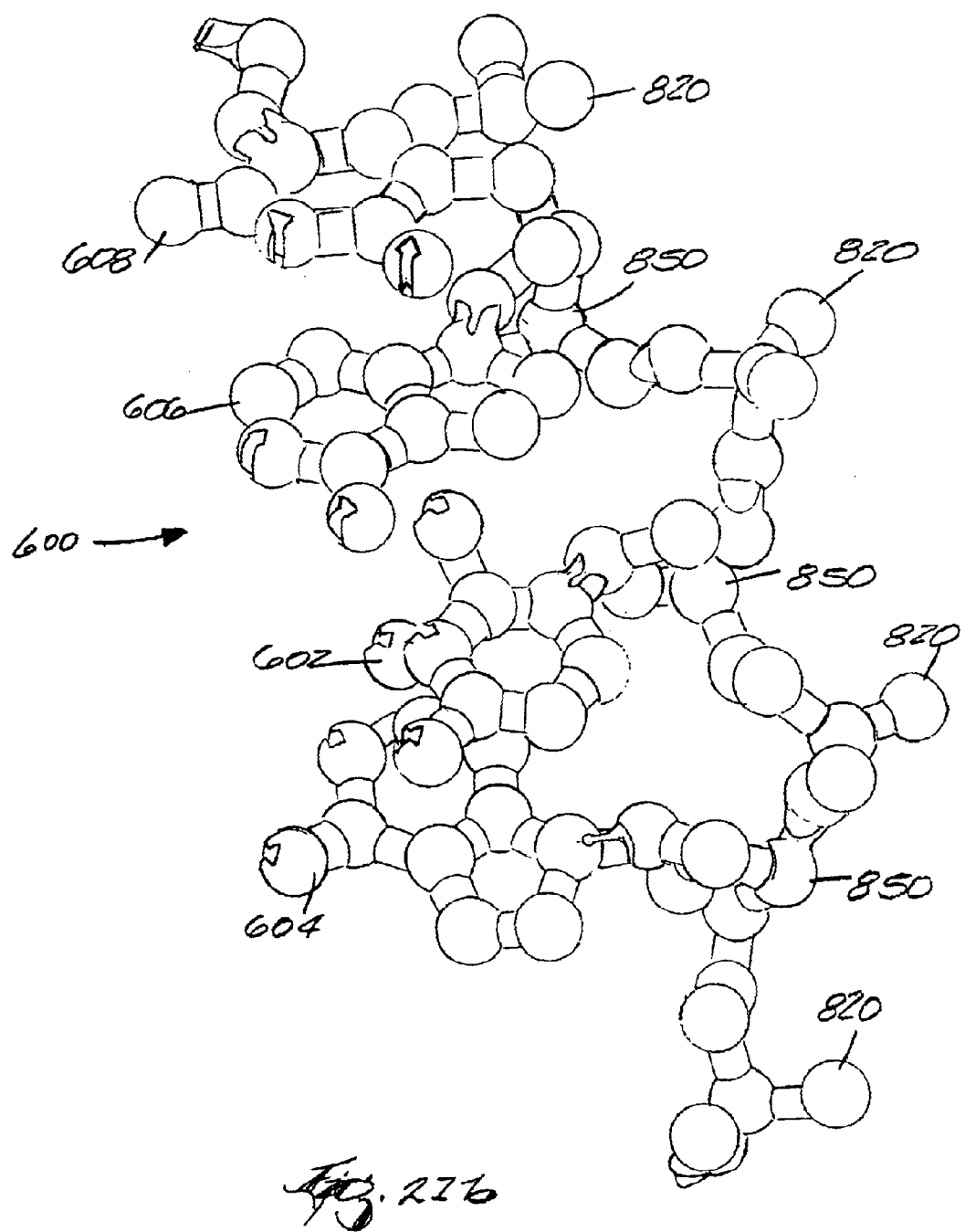

FIG. 27(a) illustrates the chemical structure of a portion of a single DNA helix, including an adenine base, a cytosine base, a guanine base, and a thymine base. FIG. 27(b) illustrates several units from the DNA construction kit assembled to form a portion of a single DNA helix. FIG. 27(b) illustrates a thymine unit 608, an adenine unit 606, a cytosine unit 602, and a guanine unit 604, several phosphate units 820, and several deoxyribose units 850. FIG. 29 illustrates a preferred embodiment of the DNA construction kit assembled to form one and a half turns of a double-helical DNA structure.

In one preferred embodiment, the nucleic acid construction kit, either a DNA kit or a RNA kit, includes 130 individual units. The nucleic acid construction kit preferably includes thirty base units 600, seventy hydrogen bond units 800, fifteen phosphate units 820, and fifteen sugar units 840.

Figure 31A:
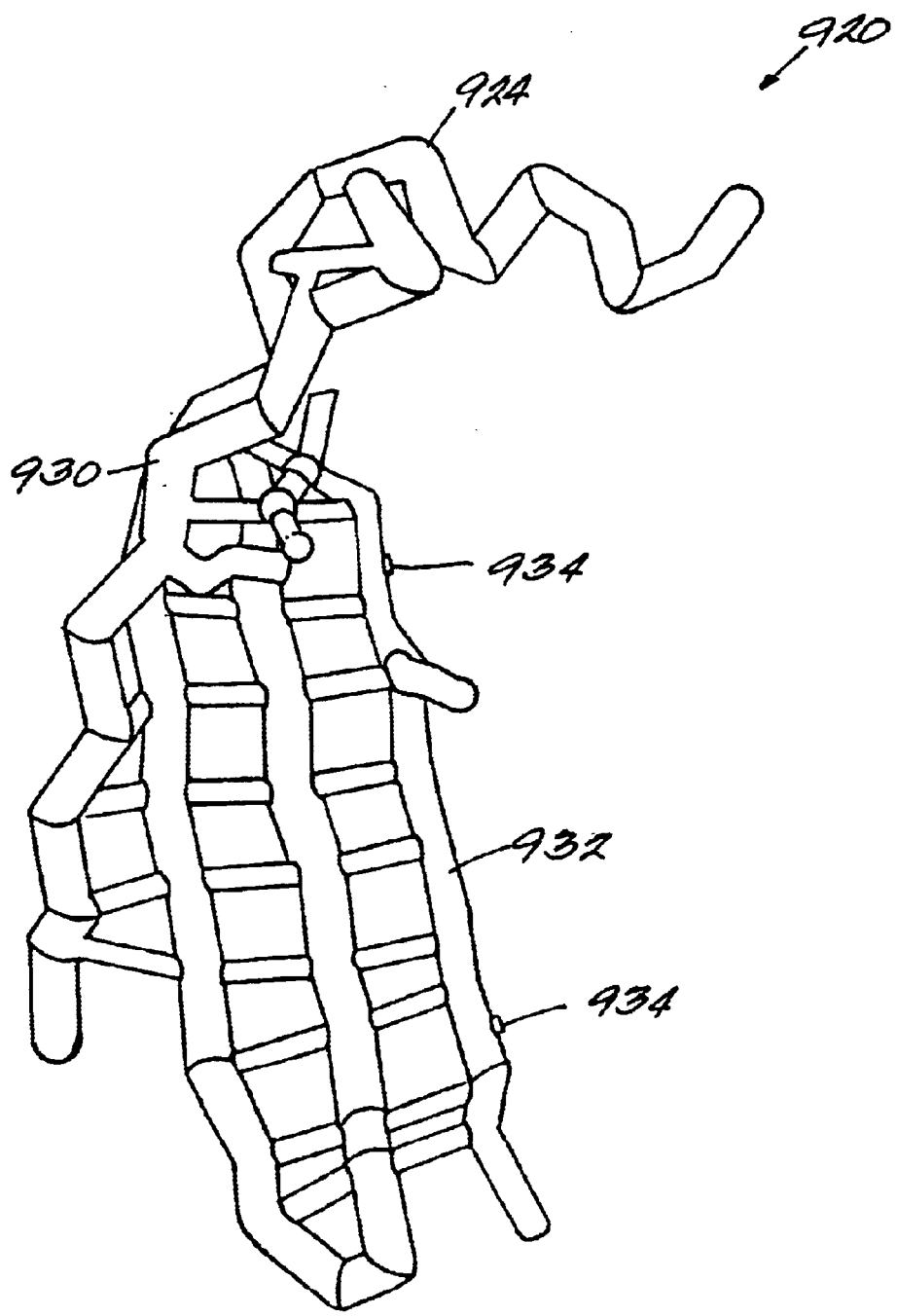
FIG. 31($a$) is a perspective view of a fragment of a green fluorescent protein (GFP) model.
Figure 31B:
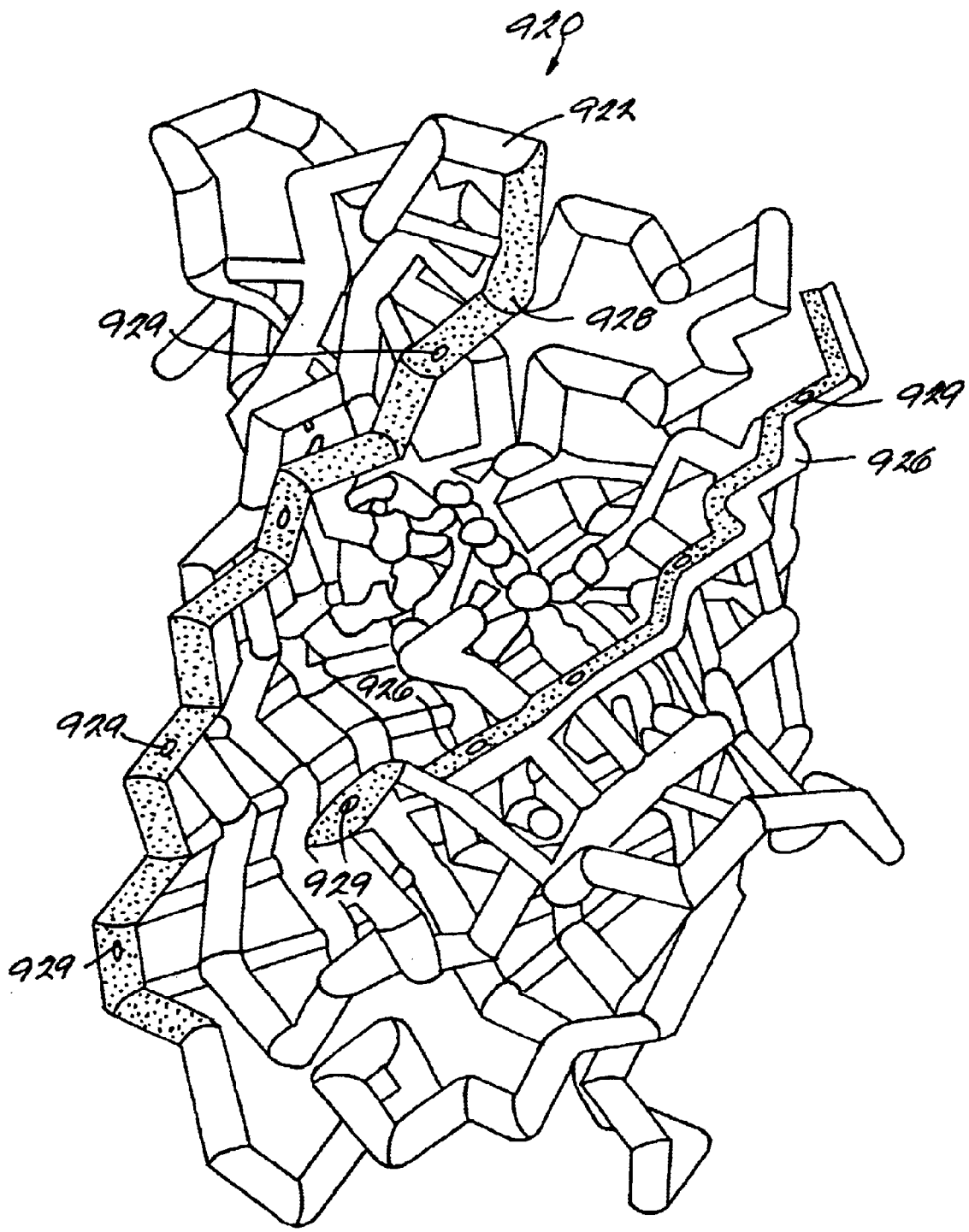
Figure 32:
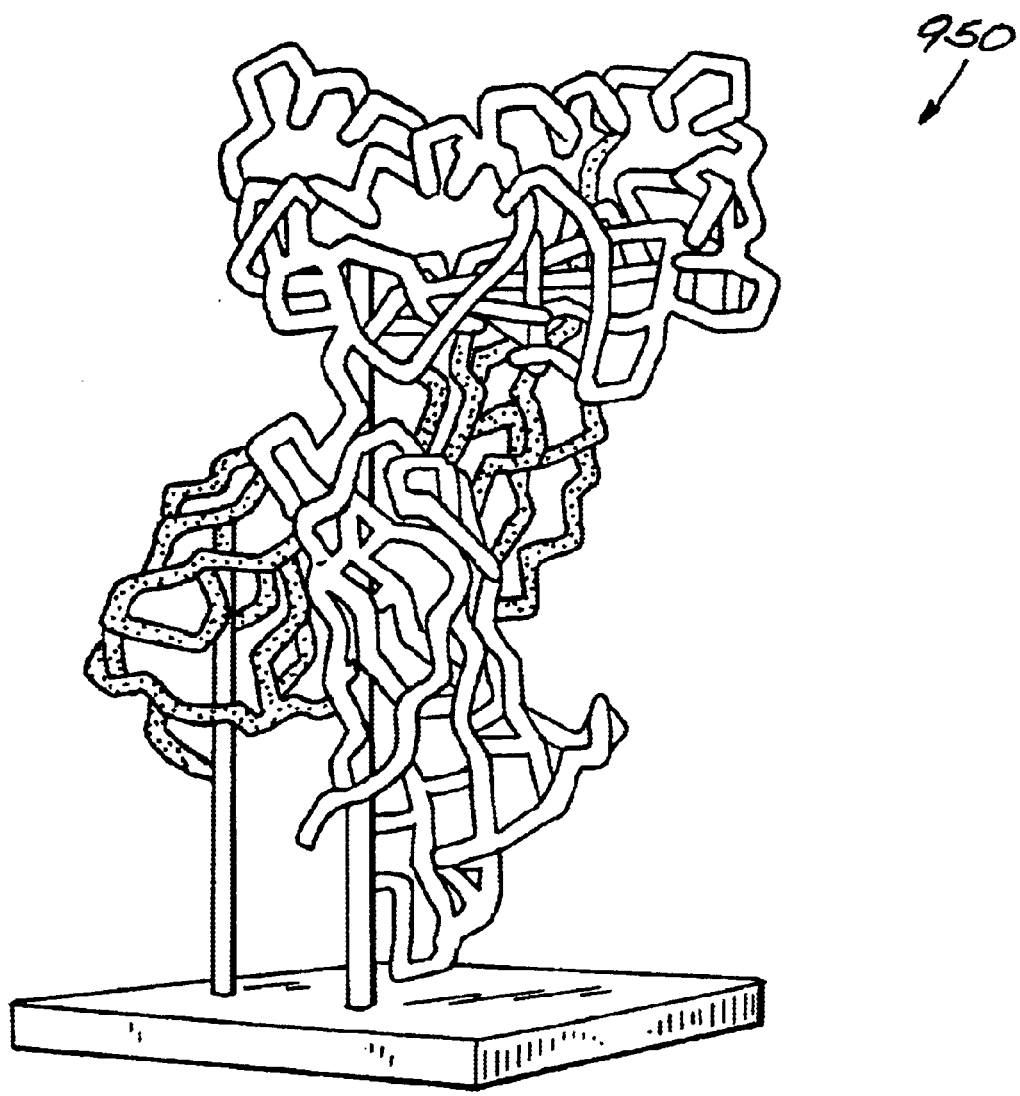
FIG. 32 is a perspective view of a fully-assembled major histocompatibility complex (MHC) model.

FIGS. 31–33 illustrate another particular embodiment of the invention in the form of protein construction kits. Similar to the alpha helix, beta sheet, and nucleic acid construction kits, protein construction kits may be constructed by dividing a protein's chemical structure into fragments, or assemblies of atoms, and constructing model units representing each fragment. The protein may be divided into fragments for instructional purposes or for manufacturing purposes. A model of each fragment can be constructed by a variety of rapid prototyping technologies. The fragments are then joined together in the correct sequence to generate a model of the entire protein. The fragments may be joined by a variety of different connectors, preferably in such a way as to establish the correct three-dimensional relationship of the fragments. The protein fragments may be color-coded according to an atomic color scheme, such as the CPK color scheme.

Examples of proteins that may be fragmented and modeled are adenosine tri-phosphate (ATP)-ase, beta-globin, calmodulin, chymotrypsin, green fluorescent protein (GFP), human immunodeficiency virus (HIV) protease, lysozyme, myosin, p53, zif268, zinc finger, major histocompatibility complex (MHC), immunoglobulin, lac repressor, and beta-galactosidase. FIGS. 31–33 illustrate two such fragmented, protein models.

FIGS. 31(a) and 31(b) illustrate a GFP model 920 including a lantern structure 922 and a fragment 924. The lantern structure 922 includes an aperture between a first strand 926 and a second strand 928. The first strand 926 and the second strand 928 each include several female engagement surfaces 929 having half sphere shapes. The fragment 924 is adapted to fit within the aperture between the first strand 926 and the second strand 928. The fragment 924 includes a first strand 930 and a second strand 932, each including several male engagement surfaces 934 having half sphere shapes adapted to be inserted into the female engagement surfaces 929. The fragment 924 may be press-fit into the lantern structure 922. The male engagement surfaces 934 of the first strand 930 of the fragment 924 are press-fit into the female engagement surfaces 929 of the first strand 926 of the lantern structure 922. Similarly, the male engagement surfaces 934 of the second strand 932 of the fragment 924 are press-fit into the female engagement surfaces 929 of the second strand 928 of the lantern structure 922.

FIG. 32 illustrates a fully-assembled MHC model 950. FIG. 33 illustrates the MHC model 950 segmented into several fragments 952. Each of the fragments 952 may be constructed using a rapid prototyping technology. The fragments 952 are then assembled to construct the MHC model 950. The fragments 952 may include several connectors (not shown) in order to ensure the proper three-dimensional orientation of the model 950.

Various features of the invention are set forth in the following claims.

What is claimed is:

1. A model of a molecule, the molecule including a first element, a second element in spaced relation from the first element, and a force acting on the first element and the second element along a vector, the model comprising:
   a first elongated strand extending along a first path corresponding to the first element;
   a second elongated strand extending along a second path spaced from the first path and corresponding to the second element, at least one of the first elongated strand and the second elongated strand including a first segment and a second segment, the first segment and the second segment adapted to be interconnected in a single orientation; and
   a connecting leg extending between the first elongated strand and the second elongated strand along a third path corresponding to the vector along which the force acts on the first element and the second element.

2. The model of claim 1 wherein the model is fabricated using a solid free form fabrication method.

3. The model of claim 2 wherein the solid free form fabrication method is a one of stereolithography, selective laser sintering, fused deposition modeling, and laminated object manufacturing.

4. The model of claim 1 wherein the molecule includes a plurality of elements and wherein the first elongated strand corresponds to a first subset of the plurality of elements, wherein the second elongated strand corresponds to a second subset of the plurality of elements, and wherein a force acts on at least two of the plurality of elements.

5. The model of claim 4 wherein the plurality of elements is a plurality of alpha carbons and wherein the force acting on the at least two of the plurality of elements is a hydrogen bond between at least two of the plurality of alpha carbons.

6. The model of claim 5 wherein the molecule includes a side chain and wherein the model includes a branch representing the side chain and coupled to at least one of the first elongated strand and the second elongated strand.

7. The model of claim 6 wherein the molecule includes a substrate and wherein the model includes a spherical member representing the substrate and coupled to at least one of the first elongated strand and the second elongated strand.

8. The model of claim 7 wherein at least one of the first elongated strand, the second elongated strand, the connecting leg, the branch, and the spherical member are color-coded according to an atomic color scheme.

9. The model of claim 8 wherein the atomic color scheme is the Corey, Pauling, Kultin color scheme.

10. The model of claim 8 wherein the atomic color scheme includes at least one of gray representing carbon, white representing hydrogen, red representing oxygen, blue representing nitrogen, orange representing iron or phosphorus, and yellow representing sulfur.

11. The model of claim 1 wherein the first segment and the second segment have respective ends having engagement surfaces affording interconnection of the first segment and the second segment.

12. The model of claim 11 wherein one of the first segment and the second segment includes a male slide connector engagement surface and the other of the first segment and the second segment includes a female slide connector engagement surface.

13. The model of claim 11 wherein the engagement surfaces are joined with a deformable piece of material, allowing the first segment and the second segment to move with respect to one another, while preventing the first segment and the second segment from completely separating from one another.

14. The model of claim 1 wherein the molecule is a protein.

15. The model of claim 14 wherein the protein is a one of adenosine tri-phosphate-ase, beta-globin, calmodulin, chymotrypsin, green fluorescent protein, human immunodeficiency virus protease, lysozyme, myosin, p53, zif268, zinc finger, major histocompatibility complex, immunoglobulin, lac repressor, and beta-galactosidase.

16. A model of a molecule, the molecule including a plurality of alpha carbons and a plurality of bonds delineating a first three-dimensional path, the model comprising:
   a first elongated tubular strand representing the plurality of alpha carbons and the plurality of bonds and extending along the first three-dimensional path, the first elongated tubular strand including at least two first strand segments, the at least two first strand segments adapted to be interconnected in a single orientation.

17. The model of claim 16 wherein the molecule includes a plurality of alpha carbons and a plurality of bands delineating a second three-dimensional path, and wherein the model further comprises a second elongated tubular strand representing the plurality of alpha carbons and the plurality of bonds and extending in spaced relation to the first elongated tubular strand along the second three-dimensional path.

18. The model of claim 17 wherein the molecule includes a hydrogen bond, and wherein a connecting leg representing the hydrogen bond is coupled between the first elongated tubular strand and the second elongated tubular strand.

19. The model of claim 18 wherein the molecule includes a side chain and wherein the model includes a branch representing the side chain and coupled to at least one of the first elongated strand and the second elongated strand.

20. The model of claim 19 wherein the molecule includes a substrate and wherein the model includes a spherical member representing the substrate and coupled to at least one of the first elongated strand and the second elongated strand.

21. The model of claim 20 wherein at least one of the first elongated strand, the second elongated strand, the connecting leg, the branch, and the spherical member are color-coded according to an atomic color scheme.

22. The model of claim 21 wherein the atomic color scheme is the Corey, Pauling, Kultin color scheme.

23. The model of claim 21 wherein the atomic color scheme includes at least one of gray representing carbon, white representing hydrogen, red representing oxygen, blue representing nitrogen, orange representing iron or phosphorus, and yellow representing sulfur.

24. The model of claim 17 wherein each of the at least two first strand segments have an end providing an engagement surface adapted to mate with an engagement surface of another of the at least two first strand segments.

25. The model of claim 24 wherein the second elongated tubular strand includes at least two second strand segments, each of the at least two second strand segments having an end providing an engagement surface adapted to mate with an engagement surface of another of the at least two second strand segments.

26. The model of claim 25 wherein one of the at least two first strand segments and one of the at least two second strand segments includes a male slide connector engagement surface and another of the at least two first strand segments and the at least two second strand segments includes a female slide connector engagement surface.

27. The model of claim 25 wherein the engagement surfaces are joined with a deformable piece of material, allowing the at least two first strand segments and the at least two second strand segments to move with respect to one another, while preventing the at least two first strand segments and the at least two second strand segments from completely separating from one another.

28. The model of claim 16 wherein the model is fabricated using a solid free form fabrication method.

29. The model of claim 28 wherein the solid free form fabrication method is a one of stereolithography, selective laser sintering, fused deposition modeling, and laminated object manufacturing.

30. The model of claim 16 wherein the molecule is a protein.

31. The model of claim 30 wherein the protein is a one of adenosine tri-phosphate-ase, beta-globin, calmodulin, chymotrypsin, green fluorescent protein, human immunodeficiency virus protease, lysozyme, myosin, p53, zif268, zinc finger, major histocompatibility complex, immunoglobulin, lac repressor, and beta-galactosidase.

32. A model of a molecule, the molecule having a first set of alpha carbons, a second set of alpha carbons, and a hydrogen bond acting on one alpha carbon of the first set of alpha carbons and one alpha carbon of the second set of alpha carbons, the model comprising:
  a first elongated strand extending along a first path corresponding to the first set of alpha carbons;
  a second elongated strand extending along a second path corresponding to the second set of alpha carbons, at least one of the first elongated strand and the second elongated strand including a first segment and a second segment, the first segment and the second segment adapted to be interconnected in a single orientation; and
  a connecting leg extending between the first elongated strand and the second elongated strand along a path corresponding to the hydrogen bond.

33. The model of claim 32 wherein the model is fabricated using a solid free form fabrication method.

34. The model of claim 33 wherein the solid free form fabrication method is a one of stereolithography, selective laser sintering, fused deposition modeling, and laminated object manufacturing.

35. The model of claim 32 wherein the molecule includes a side chain and wherein the model includes a branch representing the side chain and coupled to at least one of the first elongated strand and the second elongated strand.

36. The model of claim 35 wherein the molecule includes a substrate and wherein the model includes a spherical member representing the substrate and coupled to at least one of the first elongated strand and the second elongated strand.

37. The model of claim 36 wherein at least one of the first elongated strand, the second elongated strand, the connecting leg, the branch, and the spherical member are color-coded according to an atomic color scheme.

38. The model of wherein the atomic color scheme is the Corey, Pauling, Kultin color scheme.

39. The model of claim 37 wherein the atomic color scheme includes at least one of gray representing carbon, white representing hydrogen, red representing oxygen, blue representing nitrogen, orange representing iron or phosphorus, and yellow representing sulfur.

40. The model of claim 32 wherein the first segment and the second segment each have respective ends having engagement surfaces affording interconnection of the first segment and the second segment.

41. The model of claim 40 wherein one of the first segment and the second segment includes a male slide connector engagement surface and the other of the first segment and the second segment includes a female slide connector engagement surface.

42. The model of claim 40 wherein the engagement surfaces are joined with a deformable piece of material, allowing the first segment and the second segment to move with respect to one another, while preventing the first segment and the second segment from completely separating from one another.

43. The model of claim 32 wherein the molecule is a protein.

44. The model of claim 43 wherein the protein is a one of adenosine tri-phosphate-ase, beta-globin, calmodulin, chymotrypsin, green fluorescent protein, human immunodeficiency virus protease, lysozyme, myosin, p53, zif268, zinc finger, major histocompatibility complex, immunoglobulin, lac repressor, and beta-galactosidase.

45. A protein construction kit, the kit comprising:
a plurality of amino acid backbone units adapted to be removably coupled to one another in one of two orientations, each one of the plurality of amino acid backbone units representing an assembly of atoms;
a plurality of hydrogen bond units removably coupled to each one of the plurality of amino acid backbone units; and
a plurality of side chain units removably coupled to each one of the plurality of amino acid backbone units.

46. The kit of claim 45 wherein each one of the plurality of amino acid backbone units includes a plurality of spherical members representing each atom of the assembly of atoms and a plurality of tubular members representing bonds between each atom of the assembly of atoms.

47. The kit of claim 46 wherein the plurality of spherical members includes a first spherical member representing a nitrogen atom, a second spherical member representing an alpha carbon atom, a third spherical member representing a carbonyl carbon atom, and a fourth spherical member representing an oxygen atom.

48. The kit of claim 47 wherein each one of the plurality of amino acid units includes a first plane within which the first spherical member, the second spherical member, and the third spherical member lie, and a second plane in which the second spherical member, the third spherical member, and the fourth spherical member lie.

49. The kit of claim 48 wherein the first plane is rotated with respect to the second plane about a tubular member representing a bond between the alpha carbon atom and the carbonyl carbon atom.

50. The kit of claim 47 wherein each one of the plurality of amino acid units includes a phi angle of rotation about a tubular member representing a bond between the nitrogen atom and the alpha carbon atom, and a psi angle of rotation about a tubular member representing a bond between the alpha carbon atom and the carbonyl carbon.

51. The kit of claim 50 wherein the kit is an alpha helix construction kit, and wherein the phi angle is negative 57 degrees and the psi angle is negative 47 degrees.

52. The kit of claim 51 wherein the alpha helix construction kit includes 47 individual units, wherein the plurality of amino acid units includes 12 of the 47 individual units, wherein the plurality of hydrogen bond units includes 15 of the 47 individual units, and wherein the plurality of side chain units includes 20 of the 47 individual units, so that when the alpha helix construction kit is assembled, the alpha helix construction kit represents one and a half turns of a right-handed alpha helix.

53. The kit of claim 50 wherein the kit is a beta sheet construction kit, and wherein the plurality of amino acid backbone units includes a plurality of parallel backbone units, each one of the plurality of parallel backbone units having a phi angle of negative 119 degrees and a psi angle of positive 113 degrees, and wherein the plurality of amino acid backbone units includes a plurality of anti-parallel backbone units, each one of the plurality of anti-parallel backbone units having a phi angle of negative 139 degrees and a psi angle of positive 135 degrees.

54. The kit of claim 53 the beta sheet construction kit includes 104 individual units, wherein the plurality of parallel backbone units includes 28 of the 104 individual units, wherein the plurality of anti-parallel backbone units includes 28 of the 104 individual units, wherein the plurality of hydrogen bond units includes 20 of the 104 individual units, and wherein the plurality of side chain units includes 28 of the 104 individual units.

55. The kit of claim 45 wherein the plurality of side chain units represents at least two of glycine, alanine, valine, leucine, isoleucine, serine, threonine, cysteine, methionine, proline, asparitic acid, asparagine, glutamic acid, glutamine, lysine, arginine, histidine, phenylalanine, tyrosine, and tryptophan.

56. The kit of claim 45 wherein at least one of the plurality of amino acid backbone units, the plurality of hydrogen bond units, and the plurality of side chain units is color-coded according to an atomic color scheme.

57. The model of claim 56 wherein the atomic color scheme is the Corey, Pauling, Kultin color scheme.

58. The model of claim 56 wherein the atomic color scheme includes at least one of gray representing carbon, white representing hydrogen, red representing oxygen, blue representing nitrogen, orange representing iron or phosphorus, and yellow representing sulfur.

59. A model of a molecule, the molecule including a first element, a second element in spaced relation from the first element, and a force acting on the first element and the second element along a vector, the model comprising:
a first elongated strand extending along a first path corresponding to the first element;
a second elongated strand extending along a second path spaced from the first path and corresponding to the second element, at least one of the first elongated strand and the second elongated strand including at least two segments, the at least two segments having respective ends having engagement surfaces affording interconnection of the at least two segments, one of the at least two segments including a male slide connector engagement surface and the other of the at least two segments including a female slide connector engagement surface, the male slide connector engagement surface and the female slide connector engagement surface adapted to be interconnected in a single orientation; and
a connecting leg extending between the first elongated strand and the second elongated strand along a third path corresponding to the vector along which the force acts on the first element and the second element.

60. A model of a molecule, the molecule including a first plurality of alpha carbons and a first plurality of bonds delineating a first three-dimensional path and a second plurality of alpha carbons and a second plurality of bonds delineating a second three-dimensional path, the model comprising:
a first elongated tubular strand representing the first plurality of alpha carbons and the first plurality of bonds and extending along the first three-dimensional path, the first elongated tubular strand including at least two first strand segments, each of the at least two first strand segments having an end providing an engagement surface adapted to mate with an engagement surface of the other of the at least two first strand segments; and
a second elongated tubular strand representing the second plurality of alpha carbons and the second plurality of bonds and extending in spaced relation to the first elongated tubular strand along the second three-dimensional path, the second elongated tubular strand including at least two second strand segments, each of the at least two second strand segments having an end providing an engagement surface adapted to mate with an engagement surface of the other of the at least two second strand segments;
one of the at least two first strand segments and one of the at least two second strand segments including a male slide connector engagement surface and another of the at least two first strand segments and the at least two second strand segments including a female slide connector engagement surface, the male slide connector engagement surface and the female slide connector engagement surface being adapted to be interconnected in a single orientation.

61. A model of a molecule, the molecule having a first set of alpha carbons, a second set of alpha carbons, and a hydrogen bond acting on one alpha carbon of the first set of alpha carbons and one alpha carbon of the second set of alpha carbons, the model comprising:
 a first elongated strand extending along a first path corresponding to the first set of alpha carbons;
 a second elongated strand extending along a second path corresponding to the second set of alpha carbons; and
 a connecting leg extending between the first elongated strand and the second elongated strand along a path corresponding to the hydrogen bond;
 the model including at least two segments, the at least two segments having respective ends having engagement surfaces affording interconnection of the at least two segments, one of the at least two segments including a male slide connector engagement surface and the other of the at least two segments including a female slide connector engagement surface, the male slide connector engagement surface and the female slide connector engagement surface being adapted to be interconnected in a single orientation.

62. A macro-molecule construction kit, the kit comprising:
 a plurality of amino acid backbone units, each one of the plurality of amino acid backbone units representing an assembly of atoms, each one of the plurality of amino acid backbone units including a plurality of spherical members representing each atom of the assembly of atoms and a plurality of tubular members representing bonds between each atom of the assembly of atoms, the plurality of spherical members including a first spherical member representing a nitrogen atom, a second spherical member representing an alpha carbon atom, a third spherical member representing a carbonyl carbon atom, and a fourth spherical member representing an oxygen atom;
 a plurality of hydrogen bond units coupleable to each one of the plurality of amino acid backbone units, the first spherical member of each amino acid backbone unit representing the nitrogen atom including a first female engagement surface having a first shape coupleable to each one of the plurality of hydrogen bond units, and a second female engagement surface having a second shape coupleable to the third spherical member representing the carbonyl carbon atom of each one of the plurality of amino acid backbone units; and
 a plurality of side chain units coupleable to each one of the plurality of amino acid backbone units.

63. The kit of claim 62 wherein the first shape is a spherical shape representing a hydrogen bond and the second shape is a double spherical shape representing a covalent peptide bond, the double spherical shape adapted to allow insertion into the female engagement surface in one of two orientations.

64. The kit of claim 62 wherein the second spherical member representing the alpha carbon atom includes a female engagement surface having a third shape coupleable to each one of the plurality of side chains.

65. The kit of claim 64 wherein the third shape is a spherical shape representing a covalent bond.

66. The kit of claim 64 wherein the third spherical member representing the carbonyl carbon atom includes a male engagement surface having the second shape and coupleable to the first spherical member representing the nitrogen atom of each one of the plurality of amino acid backbone units.

67. The kit of claim 66 wherein the fourth spherical member representing the oxygen atom includes a female engagement surface having the first shape coupleable to each one of the plurality of hydrogen bond units.

68. The kit of claim 67 wherein each one of the plurality of the hydrogen bond units includes a spherical member coupled between a first male engagement surface having the first shape and a second male engagement surface having the first shape, the first male engagement surface and the second male engagement surface lying within a straight line.

69. The kit of claim 68 wherein each one of the plurality of side chain units includes at least one spherical member and at least one male engagement surface having the third shape coupleable to the female engagement surface having the third shape of the second spherical member representing the alpha carbon atom of each one of the plurality of amino acid units.

* * * * *